(12) United States Patent
Borders et al.

(10) Patent No.: US 12,475,625 B1
(45) Date of Patent: Nov. 18, 2025

(54) SYSTEMS AND METHODS FOR RENDERING AI GENERATED VIDEOS IN REAL TIME

(71) Applicant: Lagena Inc., Austin, TX (US)

(72) Inventors: Daniel Thomas Borders, New York, NY (US); Andrew Thomas Borders, Austin, TX (US); Jason Conroy Qian, Boston, MA (US)

(73) Assignee: Lagena Inc., Austin, TX (US)

( * ) Notice: Subject to any disclaimer, the term of this patent is extended or adjusted under 35 U.S.C. 154(b) by 0 days.

(21) Appl. No.: 19/205,254

(22) Filed: May 12, 2025

Related U.S. Application Data

(60) Provisional application No. 63/647,840, filed on May 15, 2024.

(51) Int. Cl.
*G06T 13/40* (2011.01)
*G06T 5/77* (2024.01)
(Continued)

(52) U.S. Cl.
CPC ............. *G06T 13/40* (2013.01); *G06T 5/77* (2024.01); *G06T 13/205* (2013.01); *G06F 40/40* (2020.01);
(Continued)

(58) Field of Classification Search
CPC .......... G06T 13/40; G06T 13/205; G06T 5/77
See application file for complete search history.

(56) References Cited

U.S. PATENT DOCUMENTS

| 2009/0278851 A1* | 11/2009 | Ach ............... G06T 13/205 345/473 |
| 2021/0312904 A1 | 10/2021 | Shukla et al. |

(Continued)

FOREIGN PATENT DOCUMENTS

| CN | 116934930 A | 10/2023 |
| CN | 117763077 A | 3/2024 |

OTHER PUBLICATIONS

Ji, Shengpeng, et al., "Wavtokenizer: An Efficient Acoustic Discrete Codec Tokenizer for Audio Language Modeling," arXiv:2408. 16532v3 [eess.AS], Feb. 25, 2025, Published as Conference Paper at ICLR 2025, 18 pages.
(Continued)

*Primary Examiner* — King Y Poon
*Assistant Examiner* — Vincent Peren
(74) *Attorney, Agent, or Firm* — DLA Piper LLP (US)

(57) ABSTRACT

Methods, systems, and computer readable media for rendering context-aware and interactive artificial intelligence-generated videos in real time. A talking face ("TF") model may traverse from a first node to a second node of a state graph via an edge based on a TF instruction generated by an interaction model. The TF model may retrieve a transition video associated with the edge and a pre-computed video template associated with the second node from one or more TF databases. The pre-computed video template may include a plurality of masked video frames and a plurality of pre-computed mouth positions for each masked video frame. The TF model may inpaint a pre-computed mouth position into a masked region of each masked video frame to form a video frame stream. The interaction model may generate a video from the transition video and the video frame stream and present the video on a user device.

30 Claims, 13 Drawing Sheets

(51) Int. Cl.
  *G06T 13/20* (2011.01)
  *G06F 40/40* (2020.01)
(52) U.S. Cl.
  CPC .... *G06T 2200/24* (2013.01); *G06T 2207/10016* (2013.01); *G06T 2207/30201* (2013.01)

(56) References Cited

U.S. PATENT DOCUMENTS

2021/0358188 A1    11/2021  Lebaredian et al.
2024/0161335 A1*   5/2024   Zhou .................. G06T 7/207

OTHER PUBLICATIONS

Van Den Oord, Aaron, et al., "Neural Discrete Representation Learning," arXiv:1711.00937v2 [cs.LG], May 30, 2018, 31st Conference on Neural Information Processing Systems (NIPS 2017), Long Beach, CA, 11 pages.
Guo, Yiwei, et al., "Recent Advances in Discrete Speech Tokens: A Review," arXiv:2502.06490v2 [eess.AS], Feb. 16, 2025, 23 pages.
Dhariwal, Prafulla, et al., "Jukebox: A Generative Model for Music," arXiv:2005.00341v1 [eess.AS], Apr. 30, 2020, 20 pages.
Chen, Bo, et al., "GSTalker: Real-time Audio-Driven Talking Face Generation via Deformable Gaussian Splatting," arXiv:2404.19040v1 [cs.CV], Apr. 29, 2024, 8 pages.
Li, Jiahe, et al., "TalkingGaussian: Structure-Persistent 3D Talking Head Synthesis via Gaussian Splatting," arXiv:2404.15264v2 [cs.CV], Jul. 5, 2024, 25 pages.
Guo, Yudong, et al., "AD-NeRF: Audio Driven Neural Radiance Fields for Talking Head Synthesis," arXiv:2103.11078v3 [cs.CV], Aug. 19, 2021, 11 pages.
Yu, Hongyun, et al., "GaussianTalker: Speaker-specific Talking Head Synthesis via 3D Gaussian Splatting," arXiv:2404.14037v3 [cs.CV], Aug. 9, 2024, 10 pages.
Kerbl, Bernhard, et al., "3D Gaussian Splatting for Real-Time Radiance Field Rendering," arXiv:2308.04079v1 [cs.GR], Aug. 8, 2023, ACM Trans. Graph., vol. 42, No. 4, Article 1, 14 pages.
Cho, Kyusun, et al., "GaussianTalker: Real-Time High-Fidelity Talking Head Synthesis with Audio-Driven 3D Gaussian Splatting," arXiv:2404.16012v2 [cs.CV], Apr. 25, 2024, https://ku-cvlab.github.jo/GaussianTalker/, 20 pages.
Lugmayr, Andreas, et al., "RePaint: Inpainting using Denoising Diffusion Probabilistic Models," arXiv:2201.09865v4 [cs.CV], Aug. 31, 2022, Extended Version of Accepted CVPR 2022 Paper, 25 pages.
Esser, Patrick, et al., "Structure and Content-Guided Video Synthesis with Diffusion Models," arXiv:2302.03011v1 [cs.CV], Feb. 6, 2023, https://research.runwayml.com/gen1, 26 pages.
Corneanu, Ciprian, et al., "LatentPaint: Image Inpainting in Latent Space with Diffusion Models," This WACV paper is the Open Access version, provided by the Computer Vision Foundation. Except for this watermark, it is identical to the accepted version, Published in 2024 IEEE/CVF Winter Conference on Applications of Computer Vision (WACV), Date of Conference: Jan. 3-8, 2024; the final published version of the proceedings is available on IEEE Xplore, Date Added to IEEE Xplore: Apr. 9, 2024, 10 pages.
Liu, Tao, et al., "Diffdub: Person-Generic Visual Dubbing Using Inpainting Renderer with Diffusion Auto-Encoder," arXiv:2311.01811v2 [cs.CV], Jan. 12, 2024, 5 pages.
Prajwal, K. R., et al., "A Lip Sync Expert Is All You Need for Speech to Lip Generation In The Wild," arXiv:2008.10010v1 [cs.CV], Aug. 23, 2020, 10 pages.
Gupta, Anchit, et al., "Towards Generating Ultra-High Resolution Talking-Face Videos with Lip Synchronization," This WACV 2023 paper is the Open Access version, provided by the Computer Vision Foundation. Except for this watermark, it is identical to the accepted version, Published in 2023 IEEE/CVF Winter Conference on Applications of Computer Vision (WACV), Date of Conference: Jan. 2-7, 2023; the final published version of the proceedings is available on IEEE Xplore, Date Added to IEEE Xplore: Feb. 6, 2023, 10 pages.
The International Search Report and the Written Opinion of the International Searching Authority issued Jul. 25, 2025, for corresponding International Application No. PCT/US2025/028905.

\* cited by examiner

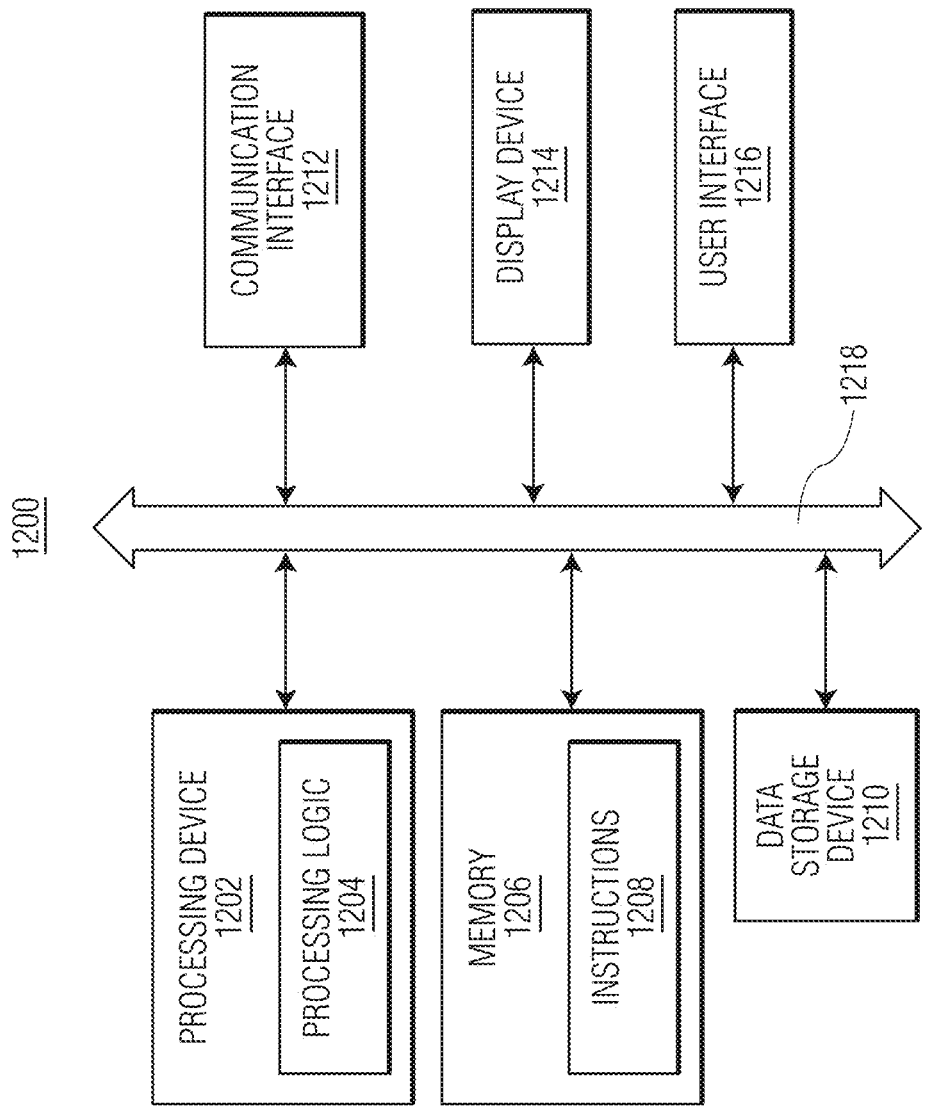

SYSTEMS AND METHODS FOR RENDERING AI GENERATED VIDEOS IN REAL TIME

TECHNICAL FIELD

The present disclosure generally relates to real time videos generated using artificial intelligence ("AI") and in particular to systems, methods, and non-transitory computer readable medium for pre-computing video sequences and using a real time algorithm to intelligently combine these sequences to generate responses (e.g., in digital humans) to human interactions.

BACKGROUND

Digital humans are lifelike, computer-generated representations of real or imagined individuals that replicate human attributes—such as facial expressions, lip movements, gestures, and speech patterns—with a high degree of realism. Powered by machine learning techniques (including generative models), and computer vision, digital humans go beyond static three-dimensional (3D) models. Digital humans can dynamically emulate human-like behaviors in real time, often incorporating emotional expressions, conversational cues, and personality-driven interactions. Digital humans provide a framework for creating immersive, interactive experiences where virtual avatars can engage audiences with natural, believable communication.

SUMMARY

Aspects of the present disclosure relate to systems, methods, and non-transitory computer readable medium for rendering context-aware and interactive artificial intelligence-generated videos in real time. An interaction model comprising one or more processors operatively coupled to a memory configured to store computer-readable instructions, may receive input from an input/output ("I/O") device of a user device. The input may include one or more of audio, video, text, and other inputs. The interaction model may determine an inferred state of the user based on the input. The interaction model may generate a talking face ("TF") instruction based on the inferred state of the user. The TF instruction may include an audio segment stream generated by a text-to-speech ("TTS") model based on a text segment stream generated by a large language model ("LLM") operator.

A TF model comprising one or more processors operatively coupled to a memory configured to store computer-readable instructions, may traverse from a first node of a state graph to a second node of the state graph via an edge based on the TF instruction. The state graph may be stored in one or more TF databases and may include a plurality of nodes each representing a state of a digital human and a plurality of edges each representing one or more of a transition from a first state of the digital human to a second state of the digital human and a transition from the first state of the digital human back to the first state of the digital human.

The TF model may retrieve a transition video associated with the edge from a plurality of transition videos stored in the one or more TF databases. The TF model may retrieve a pre-computed video template associated with the second node from a plurality of pre-computed video templates stored in the one or more TF databases. The pre-computed video template may include a plurality of masked video frames and a plurality of pre-computed mouth positions for each masked video frame of the plurality of masked video frames. The TF model may inpaint a pre-computed mouth position of the plurality of pre-computed mouth positions into a masked region of each masked video frame of the plurality of masked video frames based on the audio segment stream to form a video frame stream comprising a plurality of inpainted frames.

The interaction model may generate a video from the transition video and the video frame stream. The interaction model may display the video on an interactive graphical user interface ("GUI") of the user device.

BRIEF DESCRIPTION OF DRAWINGS

The drawings described below are for illustration purposes only. The drawings are not intended to limit the scope of the present disclosure.

FIG. 12 is a functional block diagram of the digital human interface in the example form of a computer system, according to an example of the present disclosure.

DETAILED DESCRIPTION

Figure 1:
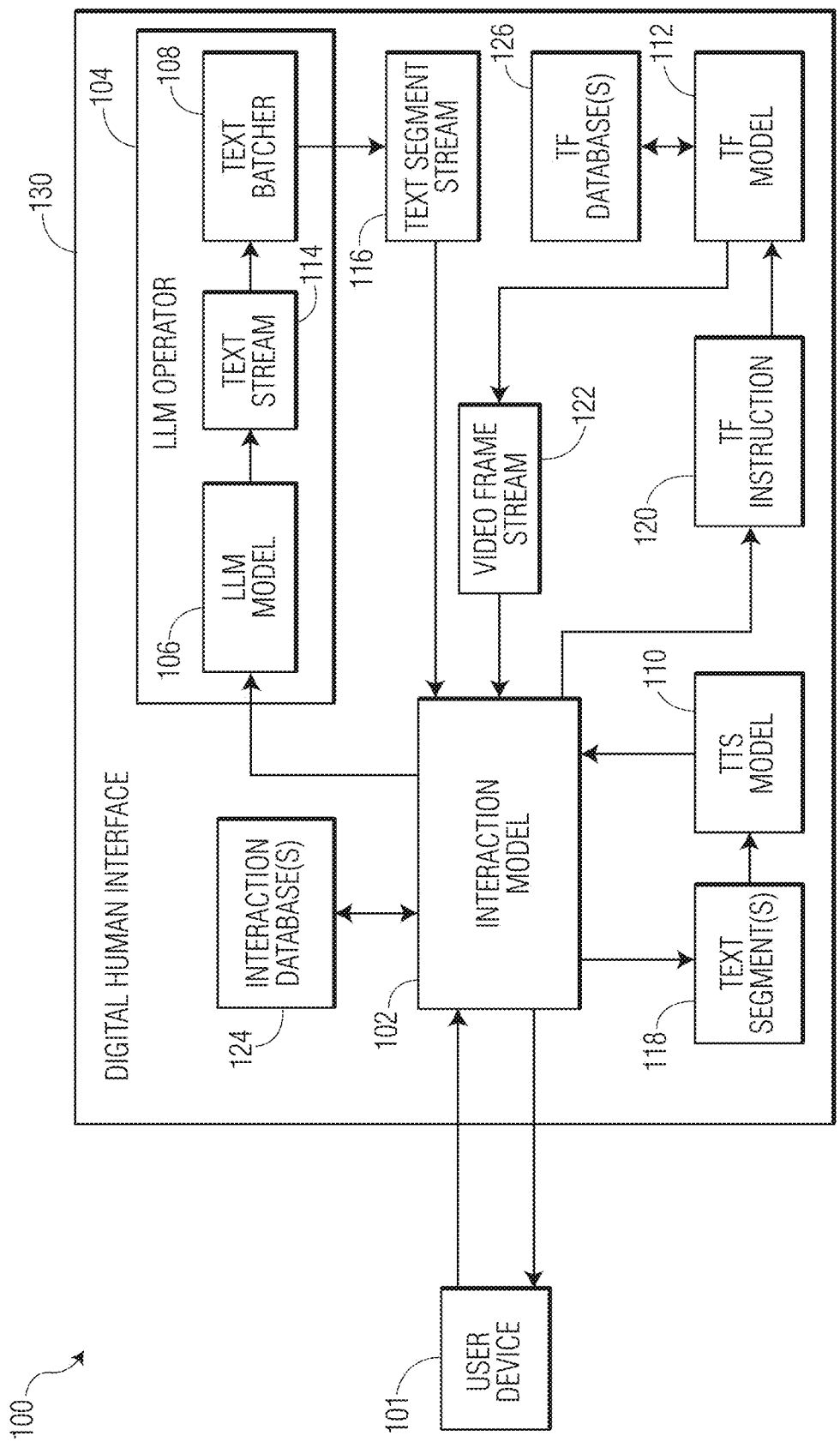
FIG. 1 is a component diagram of a first configuration of a digital human interface, according to an example of the present disclosure.

The present disclosure will now be described more fully hereinafter with reference to the accompanying drawings, which form a part hereof, and which show, by way of non-limiting illustration, certain examples. Subject matter may, however, be described in a variety of different forms and, therefore, covered or claimed subject matter is intended to be construed as not being limited to any examples set forth herein. Among other things, subject matter may be described as methods, devices, components, or systems. Accordingly, examples may take the form of hardware, software, firmware, or any combination thereof (other than software per se). The following detailed description is, therefore, not intended to be taken in a limiting sense.

As discussed above, digital humans (i.e., lifelike, AI-driven virtual avatars) are quickly transforming multiple industries. By offering human-like interactions at scale, they enable more efficient customer support, expanded sales capabilities, and innovative ways of delivering education and training. The global digital humans market is expected to reach 500 billion by 2030. Although this technology is still evolving, market forecasts suggest that digital humans will become increasingly prevalent in everyday business operations over the next five years, with sustained growth likely well beyond 2030. These forecasts are fueled by demand for 24/7 availability, personalized service, and cost savings, but tempered by concerns around trust, regulation, and implementation costs.

In customer service, digital humans are poised to handle a significant share of routine interactions, potentially automating up to 80% of basic support requests by the end of the decade. Companies see AI avatars as a cost-effective approach to offer instant, consistent assistance around the clock, reducing reliance on large call centers. While the technology's potential is vast—some analysts project the U.S. portion of a global market worth over $200 billion by 2030—issues such as consumer skepticism, data privacy requirements, and integration challenges will need to be overcome before digital humans become a truly mainstream part of customer support.

Business-to-consumer (B2C) sales applications are expected to surge as retailers and e-commerce platforms integrate digital humans as virtual sales associates. By acting as 24/7 product experts, these AI avatars can greet customers, answer questions, and guide purchasing decisions, leading to improved conversion rates. With forecasts indicating that much of the global digital human market—estimated at around $500 billion by 2030—will be driven by retail and consumer sales, U.S. companies are investing heavily in avatar-powered experiences. Achieving success, however, hinges on creating seamless integration with product databases and ensuring that customers perceive added value rather than frustration.

In the business-to-business (B2B) arena, digital humans are still in the early adoption phase but show strong potential for lead qualification, product demos, and initial customer education. Over the next five to ten years, many enterprise buyers may find themselves engaging with AI avatars for basic information, freeing human sales teams to focus on complex, high-value deals. While a fully automated B2B sales process remains less likely due to the complexity of enterprise transactions, these digital agents help standardize messaging and enhance scalability. Continued improvements in AI sophistication and integration with corporate customer relationship management ("CRM") systems will shape broader acceptance.

Education and training represent a growing but slightly slower-moving market for digital humans, as schools, universities, and corporate training departments carefully evaluate their effectiveness. By providing personalized instruction at scale, digital tutors can augment teachers in K-12 and higher education, while virtual instructors in corporate settings can deliver consistent, on-demand training. Though forecasts place the U.S. education-focused subset in the low billions by 2030, trust and proven learning outcomes will be key to broader adoption, particularly in regulated academic environments and among cautious parents, instructors, and employers.

Conventional digital humans are powered by one or more generative AI ("GenAI") large language models ("LLMs") and text to speech ("TTS") models. These GenAI models have proven themselves to be powerful text, image, and video generators. However, this power has come at a cost—computation. These models utilize a transformer architecture for computations, which scales quadratically with increasing input size. This has resulted in incredible demand for graphics processing units ("GPUs"), the chips specially designed to run these models. Manufacturers have been releasing chips that are increasingly more powerful, but they have been struggling to keep up with demand. For example, thirty two state of the art GPUs, which could each run one transformer based model, can cost upwards of $800,000 per year to operate.

Conventional digital humans are typically generated by using Gaussian splatting to render images and/or videos and performing lip syncing to audio. Gaussian splatting is a volume rendering technique that deals with the direct rendering of volume data without converting the data into surface or line primitives. A 3D Gaussian is a 3D structure that can be completely customized with a series of parameters (e.g., it can be made long and thin, spherical, etc.). The standard approach involves modeling a complex 3D object as a combination of an N number of 3D Gaussians (i.e., parameterizable shapes), where N is an integer greater than or equal to 1. Each Gaussian represents a fine-grained detail about the object. For example, a long and thin Gaussian may represent a hair. A face of a digital human may be modeled as a combination of Gaussians. A two-dimensional (2D) image may then be constructed by rendering (e.g., using a rasterization algorithm) the Gaussians on a GPU.

High-quality lip syncing aims to align the digital human's lip movements, intonation, and timing as closely as possible to the translated or re-recorded speech, preserving both the narrative intent and the natural flow of the original performance. This is typically accomplished by a machine learning model that predicts transformations (deformations) for each Gaussian from the input audio. This model is called a deformation model because it learns how to deform the Gaussians. For each frame of the video, the deformation model predicts a deformation for each Gaussian. The N number of 3D Gaussians are then transformed and the face is rendered. This may be repeated 30-100 times per second to generate a smooth video.

Generating photorealistic facial animations—particularly mouth movements, lip synchronization, and expressive behaviors—from a given audio or textual input is particularly challenging and resource intensive. The visual output must be closely aligned with the phonetic and linguistic content of the speech, capturing subtleties such as lip shapes, jaw movements, and facial expressions. It often requires advanced modeling techniques to balance realism, temporal consistency, and responsiveness so that the resulting animated face appears natural and believable.

Running the deformation model and rendering at 30-100 times per second is computationally intensive and requires GPU acceleration—an expensive but necessary resource. In fact, this portion of the pipeline often consumes 50-75% of the total computational budget, surpassing the demands of both the LLM and TTS models in many cases. Moreover, the higher the number of 3D Gaussians used to model the face (and thereby enhance visual fidelity), the more GPU memory is required to store and process these shapes. This further drives up both the computational and memory costs, underscoring the central role GPUs play in generating a high-quality, real time lip-sync experience. Despite the technological advances in GPUs, it is still not feasible—and may not be feasible in the near future—for most companies to run these transformer based models in real time.

Accordingly, there is a need for GenAI visual systems that can generate digital humans capable of interacting with human users in real time without the immense computational burdens and expenses associated with conventional techniques. The present disclosure is directed to technical solutions to this technical problem. Described herein are methods, systems, and computer-readable media capable of rendering context-aware and interactive AI-generated videos (e.g., digital humans) in real time without the need for deformation models or Gaussian splatting, which may reduce computing requirements and GPU usage. This may be accomplished by using one or more GenAI models and heuristic algorithms to generate one or more pre-computed video templates that may be adapted to any incoming audio.

A pre-computed video template may include a plurality of masked video frames (i.e., video frames having a masked region) of a masked video and a plurality of pre-computed mouth positions associated with each masked video frame of the plurality of masked video frames. The one or more GenAI models and heuristic algorithms may be used to inpaint a mouth position of the respective plurality of pre-computed mouth positions into each frame based on the incoming audio. The one or more GenAI models and heuristic algorithms may be used to create a state graph, associate the pre-computed video templates with different nodes and edges of a state graph, and traverse the state graph to respond to human interaction and render video in real time.

Referring now to FIG. 1, a component diagram of a first configuration 100 of a digital human interface 130 is shown. Creating a lifelike digital human involves orchestrating several interconnected technical components. In the first configuration 100, the digital human interface 130 may include an interaction model 102, a LLM operator 104 that includes a LLM model 106 and a text batcher 108, a TTS model 110, and a talking face ("TF") model 112. When combined effectively, these components may create a highly convincing digital human that not only speaks fluidly but also exhibits expressive humanlike mannerisms and reactions.

The interaction model 102 may orchestrate all real time inputs and outputs between the user and the digital human. For example, the interaction model 102 may receive input from a human user via a user device 101. The input may be any suitable type of input, for example, one or more of video, audio, and text. The user device 101 may include one or more input/output ("I/O") devices and a display (i.e., a display device). In an example, the I/O device may include one or more of a digital image sensor, text input and a microphone to capture audio, text and/or video of the human user. The digital image sensor may be a red, green, and blue ("RGB") image sensor or a single pixel detector device for capturing light and converting the light to digital image data (e.g., videos and/or images). The text interface may be any type of physical and/or digital keyboard that is capable of receiving textual input. The microphone include one or more transducers (e.g., an array) that converts sound into an electrical signal. The I/O device may also include a speaker for outputting audio generated for the digital human. The speaker may be one or more a transducers (e.g., an array) that converts an electrical signal into sound. The display may include an interactive graphical user interface ("GUI") that is configured to present videos of the digital human to the human user via the user device 101. In an example, the interactive GUI may include the text interface (e.g., a digital keyboard). As discussed in detail below, the interaction model 102 may process the input from the user device 101 and generate one or more prompts that are output to the LLM operator 104.

The LLM operator 104 may include a LLM model 106 and a text batcher 108. Based on the one or more prompts received from the interaction model 102, the LLM model 106 may determine what the digital human should say and what emotions it should convey it with. The LLM model 106 may not only generate coherent responses but may also integrate external business data or knowledge bases to produce contextually accurate answers. The responses from the LLM model 106 may be output as a text stream 114, which may be a continuous stream of tokens. The LLM model 106 may iteratively output 1 of M possible discrete tokens (where M is an integer greater than or equal to 1). Each token may be a string of characters. In an example, each token may represent a sub-word level character sequence. For example, the word "playing" may be tokenized with two tokens—the first token may be "play" and the second token may be "ing." The LLM model 106 may learn during training how to most optimally select its token library, so the exact token to character string translations may vary.

The text batcher 108 may be configured to utilize an algorithm to process the text stream 114 and iteratively output short batches, or segments, of text (e.g., sub-sentence or sentence length) that can be used as inputs to one or more of the TTS model 110 and the TF model 112. In an example, the text batcher 108 may split the text stream 114 using a pre-defined set of rules around punctuation (e.g., splitting at one or more of every period and every comma). In an example, the sub-sentence length segments may include one or more words. The text batcher 108 may reduce latency as the output of the LLM model 106 (i.e., the text stream 114) may be processed in real time as it is being generated by the LLM model 106, rather than all at once at the end. A text segment stream 116 may be generated by the text batcher 108 and routed to the interaction model 102 for further processing.

The interaction model 102 may generate one or more text segments 118 from the text segment stream 116 and route the one or more text segments 118 to the TTS model 110, which may be configured to generate at least one voice of the digital human. The TTS model 110 may convert text segment stream 116 into synthesized voice output, which may be routed back to the interaction model 102. The TTS model 110 may support customization, allowing developers to alter voice characteristics such as, without being limited to, one or more of pitch, timbre, gender, and accent.

In an example, one or more of the LLM model 106 and the TTS model 110 may be a publicly available GenAI model accessed via an application programing interface ("API"). In another example, one or more of the LLM model 106 and the TTS model 110 may be a publicly available GenAI model that may be fine-tuned (i.e., trained on a specialized or proprietary dataset) and deployed and run via one or more of a cloud computing architecture and on-premises servers. In yet another example, one or more of the LLM model 106 and the TTS model 110 may be built and trained from scratch (e.g., by initializing its parameters randomly and then training on a very large dataset) and deployed and run via one or more of a cloud computing architecture and on-premises server(s).

The interaction model 102 may generate one or more TF instructions 120 from the text segment stream 116 and route the TF instruction(s) 120 to the talking face ("TF") model 112, which may generate the face of the digital human. The TF model 112 may align the lips and facial movements with the generated audio from the TTS model 110 to enable realistic visual expressions that mirror speech patterns output by the TTS model 110. The TF model 112 may be coupled to one or more TF databases 126. As described below, the one or more TF databases 126 may be configured to store the plurality of masked video frames and the plurality of pre-computed mouth positions of the pre-computed video templates. The TF model 112 may generate one or more video frame streams 122 and route them to the interaction model 102. The interaction model 102 may assemble all audio and video aspects of the digital human and present the digital human as an audio/visual output to user device 101 for display to the human user.

The interaction model 102 may be coupled to one or more interaction databases 124. The one or more interaction databases 124 may be configured to store the input received from the user device 101, the text segment stream 116, the video frame stream 122, the text segments 118, and the TF instructions 120.

Figure 2:
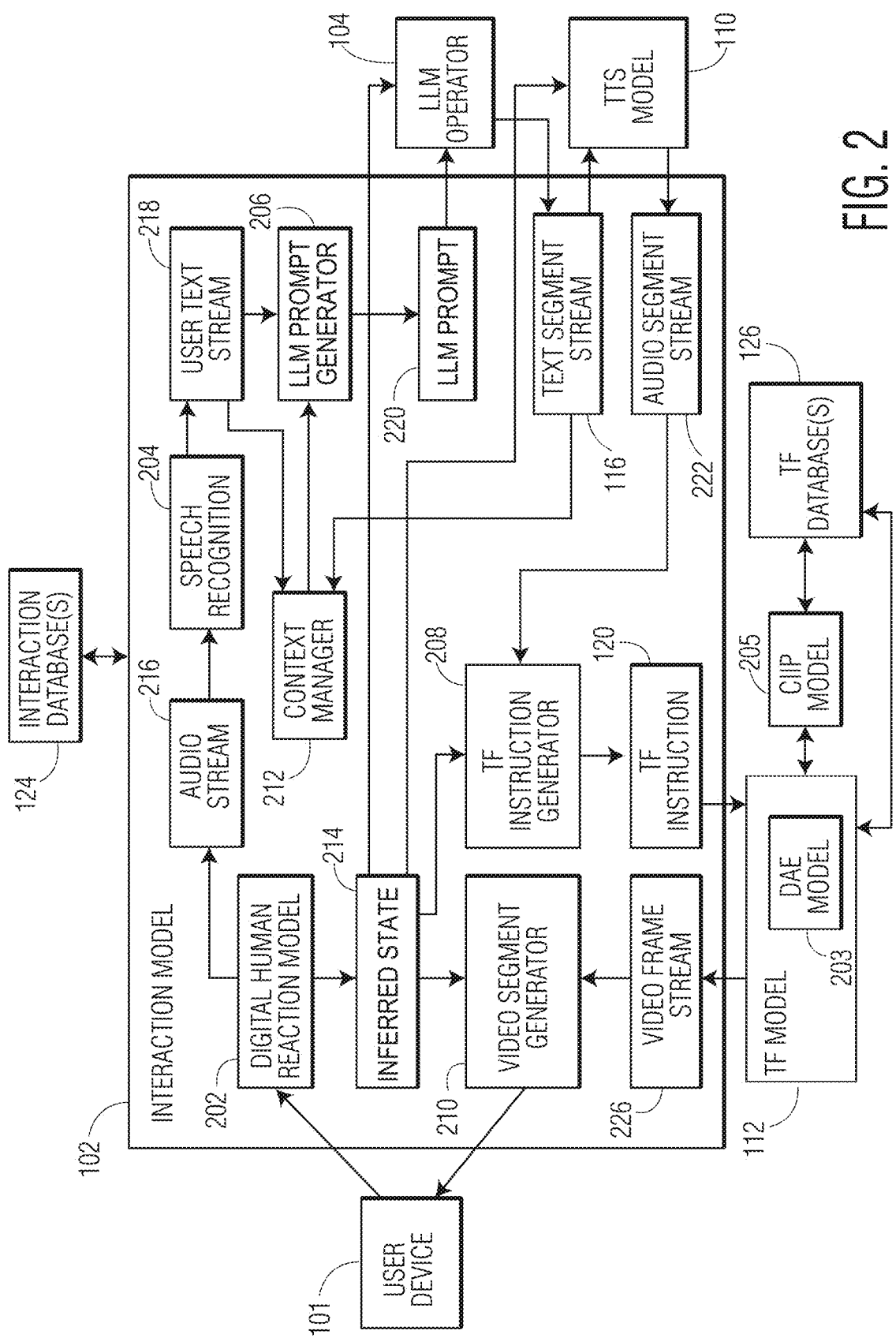
FIG. 2 is a component diagram of an interaction model of the first configuration of the digital human interface, according to an example of the present disclosure.

Referring now to FIG. 2, a component diagram of the interaction model 102 of the first configuration 100 of the digital human interface 130 is shown, according to an example of the present disclosure. The interaction model 102 may include a digital human reaction model 202, a speech recognition system 204, an LLM prompt generator 206, a TF instruction generator 208, a video segment generator 210, and a context manager 212.

In general, the interaction model 102 may orchestrate all real time inputs and outputs between the user and the digital human to provide fluid responsive conversations. To accomplish this, the interaction model 102 may be configured to listen and watch the user, detect when to pause speaking, convert user audio into text, keep track of conversation history and context, construct and send prompts to the LLM operator 104, store a queue of LLM generated text segments, send LLM generated text segments to the TF model 112, and send video frames generated by the TF model 112 to the user.

The digital human reaction model 202 may be configured to one or more of listen to audio of the user, watch video of the user, and/or monitor text input from the user to assess the state of the user (e.g., talking, listening, or confused) and generate at least one inferred state 214. As used herein, the term "state" may be an emotional and physical representation of a face (e.g., happy-talking, sad-talking, happy-listening, sad-listening, etc.). The inferred state(s) 214 of the user may be used to control how the interaction model 102 behaves. For example, if the inferred state 214 is talking, the interaction model 102 may prioritize listening. The digital human reaction model 202 may send the inferred state 214 to one or more of the TF instruction generator 208, the video segment generator 210, the TTS model 110, and the LLM operator 104 for processing. The digital human reaction model 202 may also send an audio stream 216 from the user to the speech recognition system 204.

The speech recognition system 204 may include a machine learning model for speech recognition and transcription. The speech recognition system 204 may convert the audio stream 216 into a user text stream 218, which may be input to the LLM prompt generator 206. The user text stream 218 may also be sent to the context manager 212 to maintain ongoing context, which context may enable the LLM prompt generator 206 to craft a history-aware LLM prompt 220 for the LLM operator 104.

The LLM prompt generator 206 may utilize a heuristic (i.e., rule based) algorithm to generate at least one LLM prompt 220. The LLM prompt 220 may include, for example, one or more of instructions, a history of interactions with the user, and one or more elements of the user text stream 218. The instructions may include context/directions on how the LLM operator 104 should behave (e.g., "You are a helpful customer service agent"). The history may contain previous input received from the user device 101 and/or one or more past conversations between the human and digital human. The LLM prompt generator 206 may generate the instructions based on the intended use case of the digital human (e.g., customer service, business-to-business, business-to-customer, etc.) and may use a set of rules to retrieve the history to package it into a coherent interaction history. The LLM operator 104 may also use the inferred state 214 as an input.

The text segment stream 116 produced by the LLM operator 104 may be routed to the context manager 212 to further maintain ongoing context. One or more text segments 118 (shown in FIG. 1) from the text segment stream 116 may be routed to the TTS model 110 to generate the voice of the digital human. The TTS model 110 may also use the inferred state 214 as an input.

An audio segment stream 222 generated by the TTS model 110 may be routed to the TF instruction generator 208. The TF instruction generator 208 may be configured to tailor the TF instructions 120 for the TF model 112. The TTS model 110 and the TF instruction generator 208 may also use the inferred state 214 as an input. The TF instruction generator 208 may be implemented as one or more of a heuristic (i.e., a rule based) model and an AI model. The heuristic model may assume turn-taking behavior in conversations (e.g., one party always waits for the other party to complete speaking before they speak). However, in practice a user may interrupt and pause in the middle of speaking, which could be interpreted as the end of a turn. While shown as separate components, the digital human reaction model 202 and the TF instruction generator 208 may be a single model that interprets the user input and directly predicts what the TF model 112 should do.

The TF model 112 may send a video frame stream 226 to the video segment generator 210. The video frame stream 226 may be made up of individual video frames of a face of the digital human with the lips synced to the audio segment stream 222. The video segment generator 210 may assemble the individual video frames to generate a video that is displayed to the user, closing the feedback loop and supporting a smooth natural dialogue flow between the user and the digital human.

As described in detail below, based on the TF instructions 120, the TF model 112 may select a mouth position of the plurality of mouth positions associated with each masked video frame of the plurality of masked video frames and inpaint the selected mouth position to the respective masked video frame of the plurality of masked video frames to align with the audio segment stream 222.

By pre-computing multiple mouth shapes or positions from pre-existing footage of a face, these shapes may be dynamically selected and combined in real time based on incoming audio. This may ensure that lip movements of the digital human(s) match the new speech without requiring deep learning models during interactions with the human user. The look and feel—including any emotional or physical cues—may remain consistent with the original video that the mouth positions are computed from, as the process effectively swaps in the correct mouth positions rather than modifying the rest of the face. These lip-synced videos may preserve most aspects of the original footage—body posture, facial expression, and other contextual cues—and may reliably convey the same emotional and physical state. By using the masking process, only the mouth region may be changed to match the target audio. This may make the final result appear more natural than a static or still image. The precomputed video templates may be updated in real time with different audio tracks while preserving the overall integrity and expressiveness of the original recording.

The TF model 112 may include a discrete audio embedding ("DAE") model 203, which may be operatively coupled to a conditional image inpainting ("CIIP") model 205. The CIIP model 205 may be used to generate precomputed video templates. The DAE model 203 may represent audio as a sequence of discrete (1 of P options) representations, where P is an integer greater than or equal to 1. The CIIP model 205 may fill in a masked portion of a masked video frame (i.e., an image) based on a condition. The DAE model 203 and the CIIP model 205 are described further below with respect to FIGS. 6-10.

Figure 3:
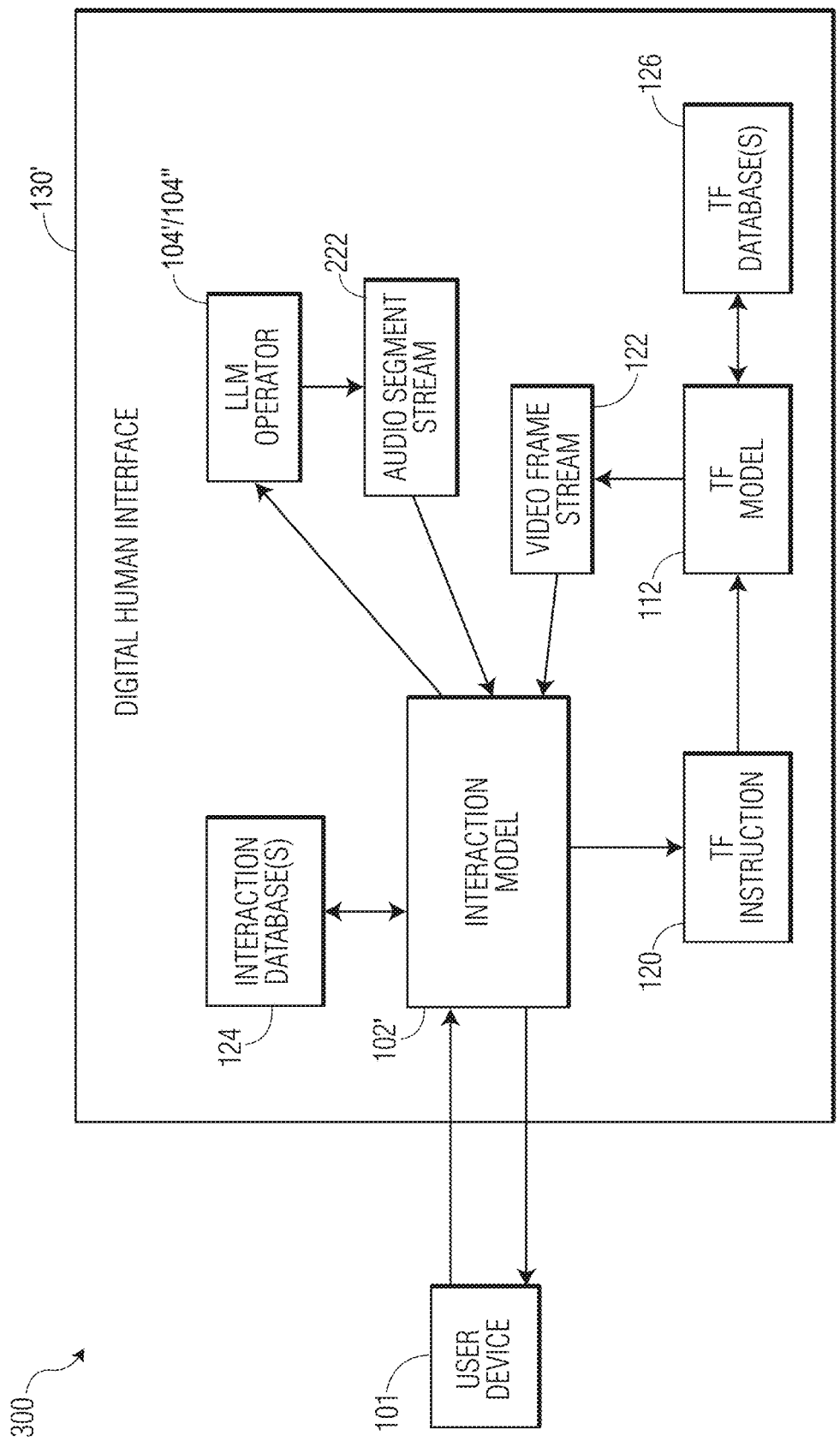
FIG. 3 is a component diagram of a second configuration of the digital human interface, according to an example of the present disclosure.

Referring now to FIG. 3, a component diagram of a second configuration 300 of a digital human interface 130' similar to the digital human interface 130 (FIG. 1) is shown. In the second configuration 300, the LLM operator 104 may be configured to generate the audio segment stream 222 directly. As such, in the second configuration 300, the digital human interface 130' may include an interaction model 102', the one or more interaction databases 124, an LLM operator 104' or LLM operator 104" similar to the LLM operator 104 (FIG. 1), the TF model 112, and the one or more TF databases 126. The remainder of the components and processing steps may be similar to those described above in reference to the first configuration 100 of the digital human interface 130. For example, the interaction model 102', similar to the interaction model 102 (FIG. 2) may generate one or more TF instructions 120 from the audio segment stream 222 and route the TF instruction(s) 120 to the TF model 112, which may generate the face of the digital human as described above.

Figure 4:
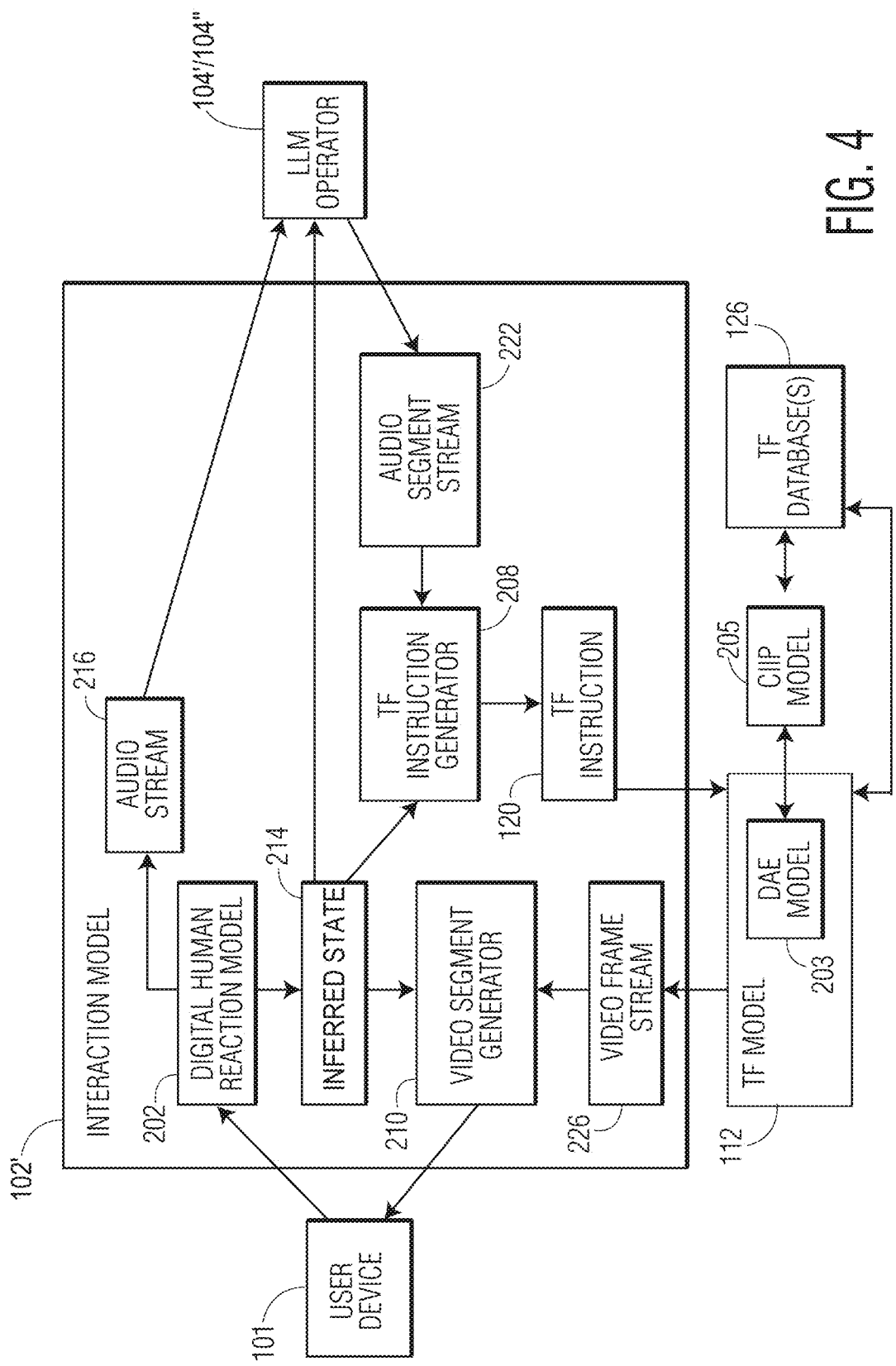
FIG. 4 is a component diagram of the interaction model of the second configuration of the digital human interface, according to an example of the present disclosure.

Referring now to FIG. 4, a component diagram of the interaction model 102' of the second configuration 300 of the digital human interface 130' is shown, according to an example of the present disclosure. In the second configuration 300, the digital human reaction model 202 may send one or more of the audio stream 216 and the inferred state 214 directly to the LLM operator 104' or the LLM operator 104", which may generate the audio segment stream 222 for the TF instruction generator 208. The remainder of the components and processing steps for the interaction model 102' may be similar to those described above in reference to the interaction model 102 (FIG. 2) of the first configuration 100 of the digital human interface 130.

For example, the audio segment stream 222 may be routed to the TF instruction generator 208. The TF instruction generator 208 may be configured to tailor the TF instructions 120 for the TF model 112. The TF instruction generator 208 may also use the inferred state 214 as an input. The TF instruction generator 208 may be implemented as one or more of a heuristic (i.e., a rule based) model and an AI model. The heuristic model may assume turn-taking behavior in conversations (e.g., one party always waits for the other party to complete speaking before they speak). However, in practice a user may interrupt and pause in the middle of speaking, which could be interpreted as the end of a turn.

While shown as separate components, the digital human reaction model 202 and the TF instruction generator 208 may be a single model that interprets the user input and directly predicts what the TF model 112 should do. The TF instruction(s) 120 may be routed to the TF model 112, which may generate the face of the digital human as described above.

Figure 5A:
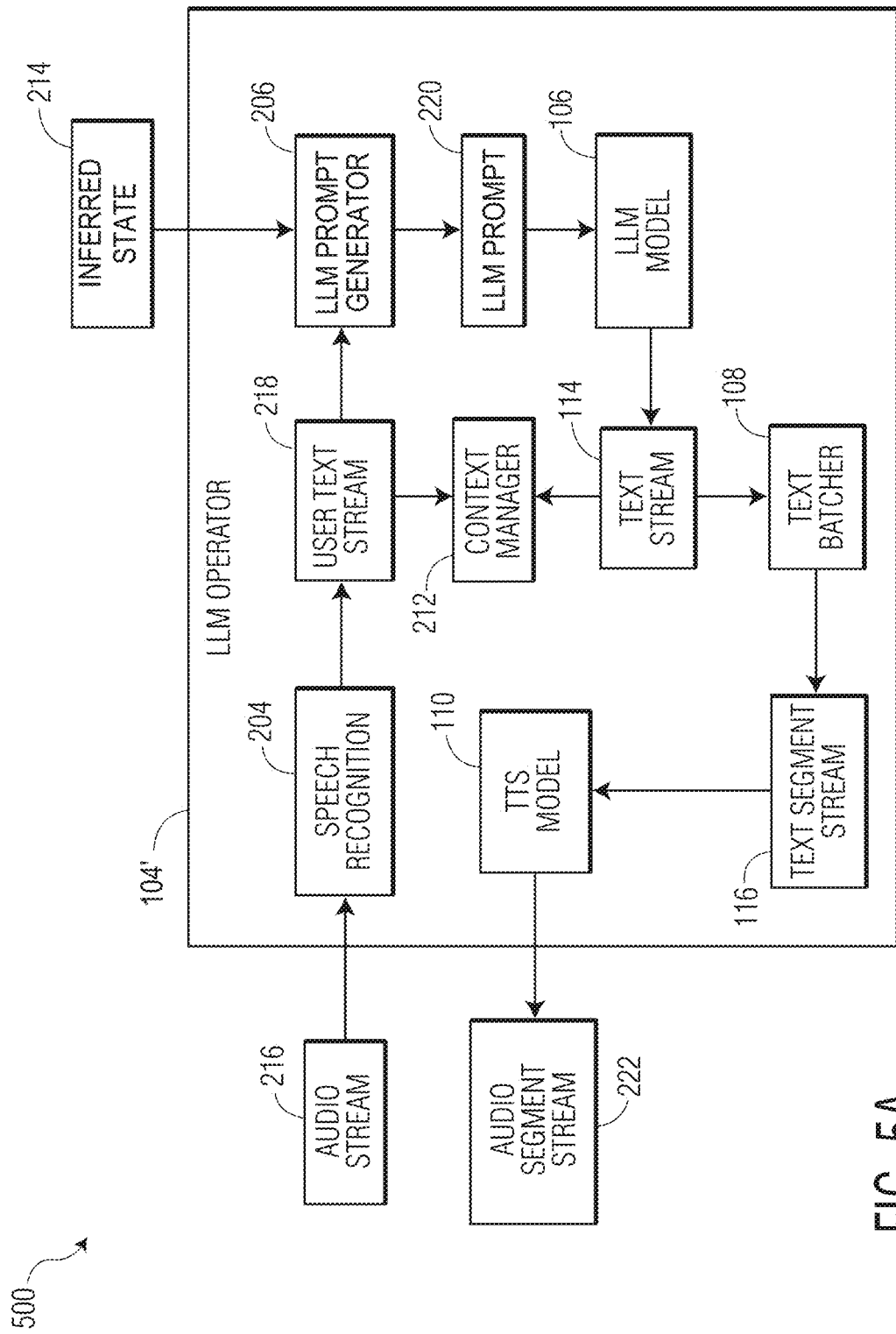
FIG. 5A is a component diagram of a first configuration of a large language model ("LLM") model of the second configuration of the digital human interface, according to an example of the present disclosure.

Referring now to FIG. 5A, a component diagram of a first example 500 of the LLM operator 104' that may be used with the second configuration 300 of the digital human interface 130' is shown (e.g., together with interaction model 102'), according to an example of the present disclosure. The first example 500 of the LLM operator 104' may be a text based operator and may include the speech recognition system 204, the LLM prompt generator 206, the context manager 212, the LLM model 106, the text batcher 108, and the TTS model 110. These components and processing steps may be similar to those described above in reference to the first configuration 100 of the digital human interface 130.

For example, the speech recognition system 204 may include a machine learning model for speech recognition and transcription. The speech recognition system 204 may convert the audio stream 216 into a user text stream 218, which may be input to the LLM prompt generator 206. The user text stream 218 may also be sent to the context manager 212 to maintain ongoing context, which context may enable the LLM prompt generator 206 to craft a history-aware LLM prompt 220 for the LLM operator 104'.

The LLM prompt generator 206 may utilize a heuristic (i.e., rule based) algorithm to generate at least one LLM prompt 220. The LLM prompt 220 may include, for example, one or more of instructions, a history of interactions with the user, and one or more elements of the user text stream 218. The instructions may include context/directions on how the LLM operator 104' should behave (e.g., "You are a helpful customer service agent"). The history may contain previous input received from the user device 101 and/or one or more past conversations between the human and digital human. The LLM prompt generator 206 may generate the instructions based on the intended use case of the digital human (e.g., customer service, business-to-business, business-to-customer, etc.) and may use a set of rules to retrieve the history to package it into a coherent interaction history. The LLM operator 104' may also use the inferred state 214 as an input.

The text segment stream 116 produced by the LLM operator 104' may be routed to the context manager 212 to further maintain ongoing context. The text segment stream 116 may be routed to the TTS model 110 to generate the audio segment stream 222.

Figure 5B:
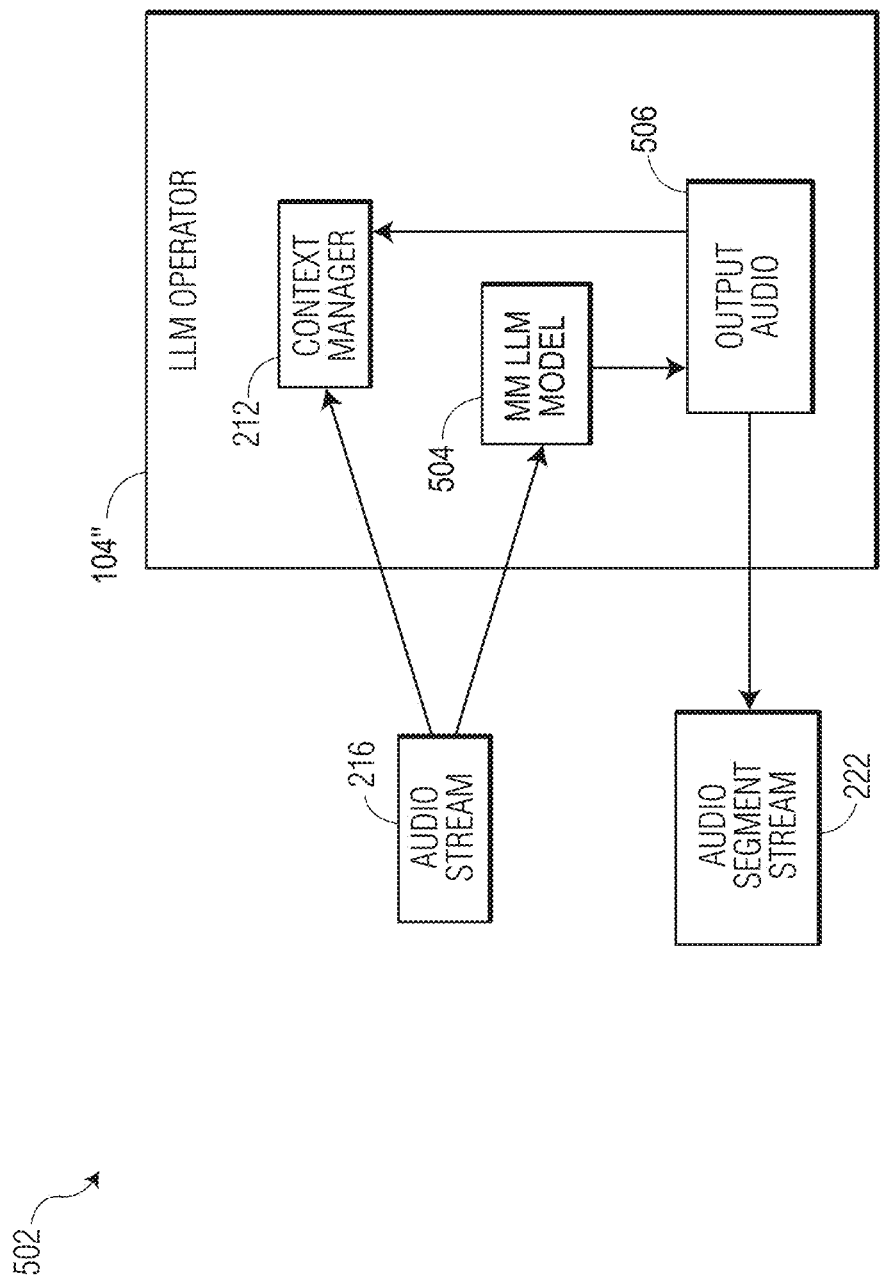
FIG. 5B is a component diagram of a second configuration of an LLM model of the second configuration of the digital human interface, according to an example of the present disclosure.

Referring now to FIG. 5B, a component diagram of a second example 502 of the LLM operator 104" that may be used with the second configuration 300 of the digital human interface 130' is shown (e.g., with interaction model 102'), according to an example of the present disclosure. The second example 502 of the LLM operator 104" may include a multimodal LLM model 504 capable of taking the audio stream 216 as an input and directly generating output audio 506. The output audio 506 may be output from the LLM operator 104" as the audio segment stream 222. In an example, the multimodal LLM model 504 may not use the inferred state 214 (see FIG. 5A) as an input as the multimodal LLM model 504 may be able to infer a state directly from the audio stream 216.

Figure 6:
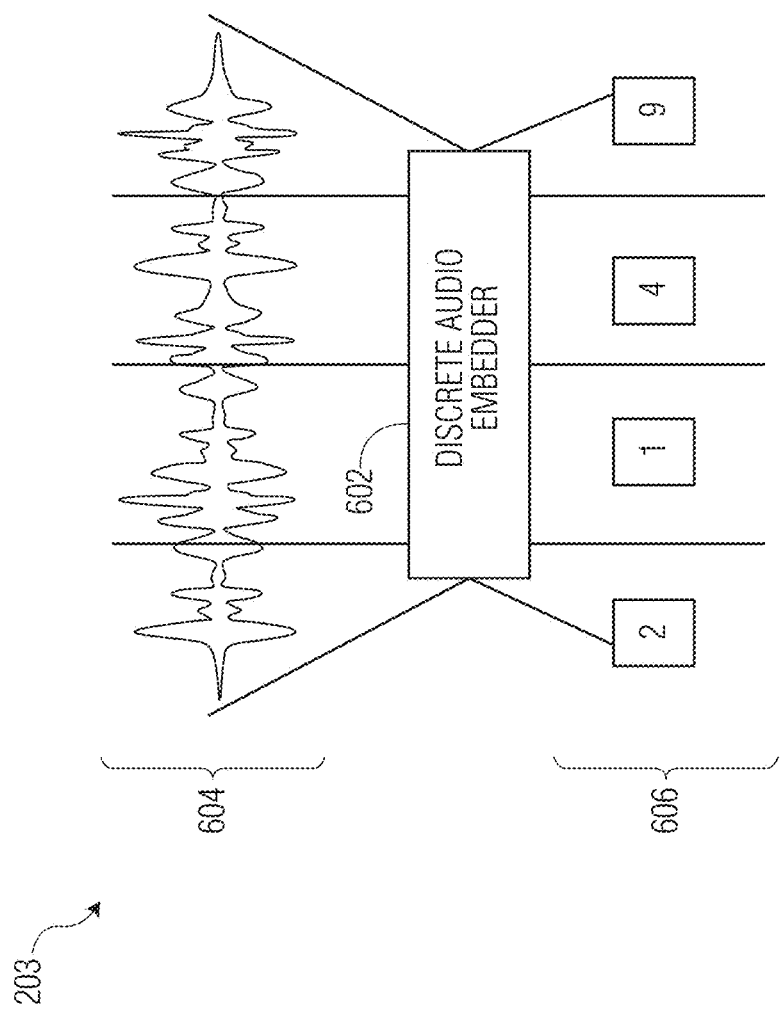
FIG. 6 is a diagram illustrating a discrete audio embedding ("DAE") model, according to an example of the present disclosure.

Referring now to FIG. 6, a diagram illustrating the DAE model 203 is shown. As discussed above, the TF model 112 may include the DAE model 203. The TF model 112 may be part of the first configuration 100 of the digital human interface 130 or the second configuration 300 of the digital human interface 130'. The DAE model 203 may be very lightweight and configured to be run in real time on one or more of a central processing unit ("CPU") and a graphics processing unit ("GPU"). The DAE model 203 may include a discrete audio embedder 602 configured to embed target audio 604 into a sequence of discrete embeddings 606. In an example, the discrete audio embedder 602 may create an R number of discrete embeddings 606 per second of audio to match the frame rate of any generated video (where R is an integer greater than or equal to 1). In a non-limiting example, R may be 30 embeddings. As such, there may be one discrete embedding 606 per frame of video. The discrete embeddings 606 may each correspond to a specific mouth position.

Figure 7:
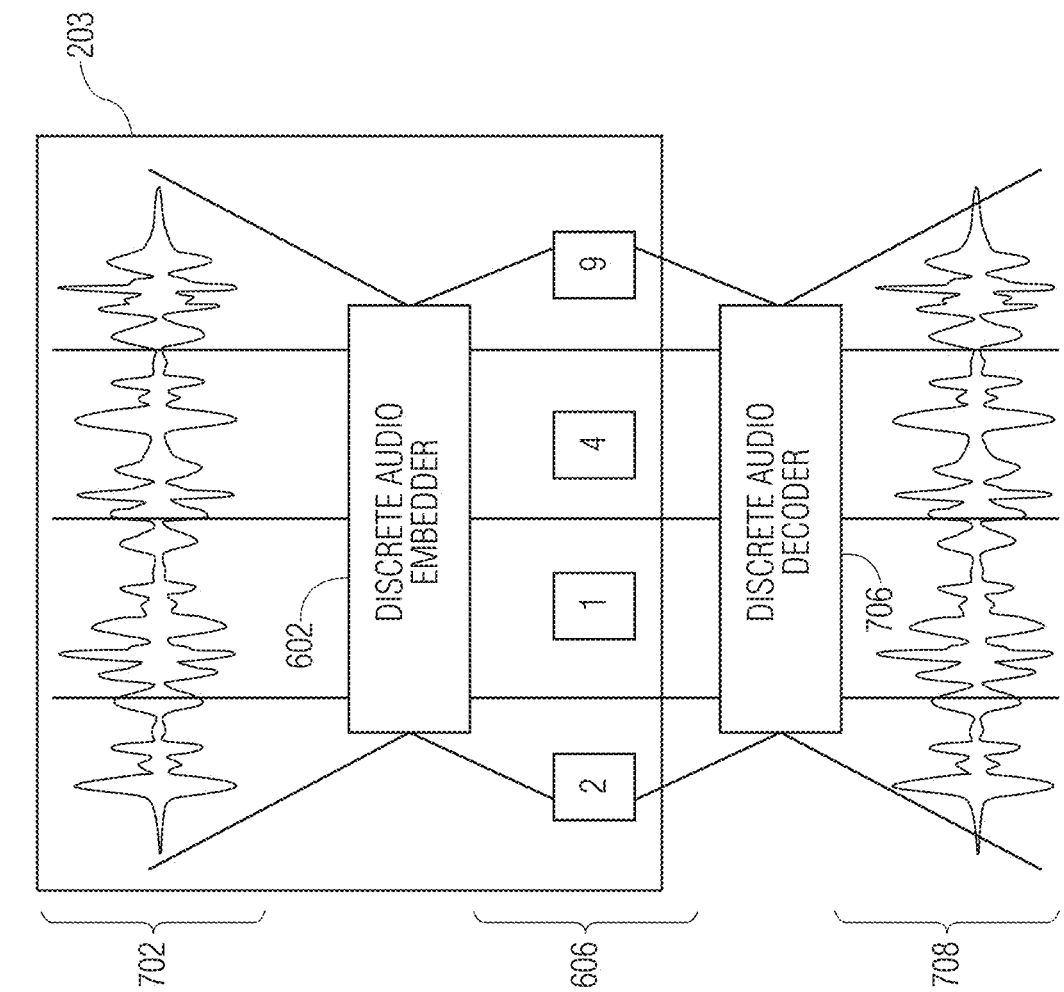
FIG. 7 is a diagram illustrating a training process for the DAE model, according to an example of the present disclosure.

Referring now to FIG. 7, a diagram illustrating a training process 700 for the DAE model 203 is shown. The DAE model 203 may be trained on an in-house dataset of audio recordings (e.g., of people talking). The discrete audio embedder 602 may segment an audio clip 702 from the in-house dataset of audio recordings and create a set of discrete embeddings 606. In an example, the discrete audio embedder 602 may create the R number of discrete embeddings 606 per second of the audio clip 702 to match the frame rate of any generated video. A discrete audio decoder 706 may then convert the discrete embeddings 606 back into a reconstructed audio clip 708. The DAE model 203 may be trained by comparing the reconstructed audio clip 708 to the respective input audio clip 702 to generate one or more training metrics (e.g., degree of similarity) to ensure a match. The discrete embeddings 606 may contain most or all of the information in the input audio clip 702.

The discrete embeddings 606 may be stored in one or more codebooks within the one or more TF databases 126. The one or more codebooks may include a set of learned audio representations. Each of the discrete embeddings 606 may be represented as an index in the one or more codebooks. In an example, the training process 700 may be repeated using a different audio clip 702 until the number of discrete embeddings 606 stored in the one or more codebooks include every discrete audio representation of human speech.

Figure 8:
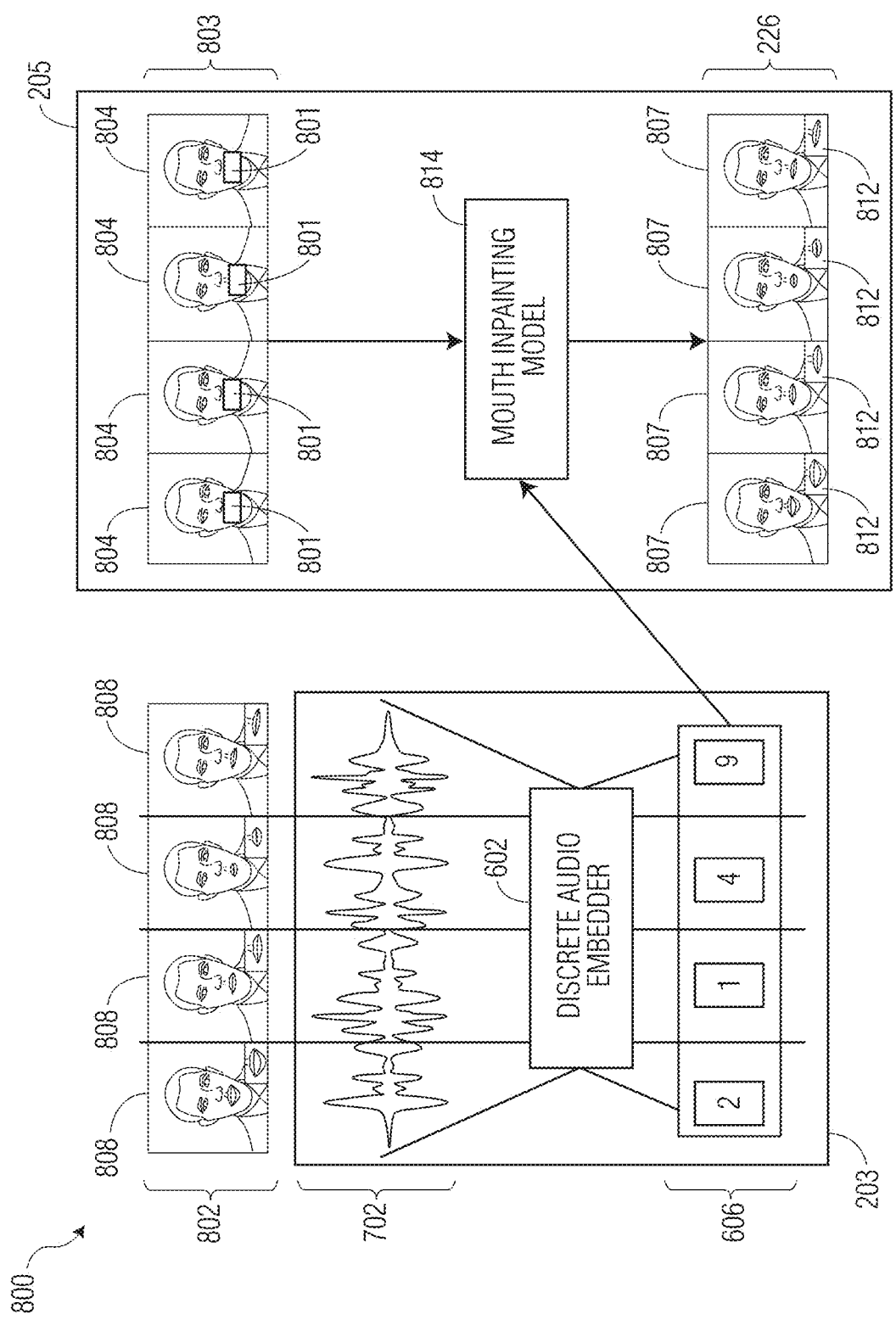
FIG. 8 is a diagram illustrating a training process for a conditional image inpainting ("CIIP") model, according to an example of the present disclosure.

Referring to FIG. 8, a diagram illustrating a training process 800 for the CIIP model 205 is shown. In an example, the CIIP model 205 may be separate from the TF model 112 that is part of the first configuration 100 of the digital human interface 130 or the second configuration 300 of the digital human interface 130'. In another example, the CIIP model 205 may be included in the TF model 112 that is part of the first configuration 100 of the digital human interface 130 or the second configuration 300 of the digital human interface 130'.

The training process 800 may utilize a video of a human face talking as a training video 802. In an example, the training video 802 may be converted into a sequence of training video frames 808. The associated audio clip 702 from the training video 802 may be run through the discrete audio embedder 602, which may encode the audio clip 702 into a set of discrete embeddings 606, and output a discrete embedding 606 for each training video frame 808.

A mouth inpainting model 814 of the CIIP model 205 may use the discrete embeddings 606 as conditions to inpaint a masked region 801 of each masked video frame 804 of a masked video 803. The masked region 801 (e.g., one or more mouth regions, possibly including the chin) may be masked using an open source face segmentation model. For training purposes, the masked video 803 may be the same video as the training video 802.

The training video frame 808 may be used as a ground truth for the masked region 801 of each masked video frame 804 of the masked video 803. In this manner, the mouth inpainting model 814 may learn to fill in a proper mouth position 812 based on the discrete embedding 606 representing the audio for that training video frame 808. The output of the mouth inpainting model 814 may be a plurality of inpainted video frames 807. The CIIP model 205 may be trained by comparing the plurality of inpainted video frames 807 to the respective training video frames 808 to generate one or more training metrics (e.g., degree of similarity) to ensure a match. Each inpainted video frame 807 may be enforced to be visually the same as a corresponding training video frame 808. The plurality of inpainted video frames 807 may form video frame stream 226.

Figure 9:
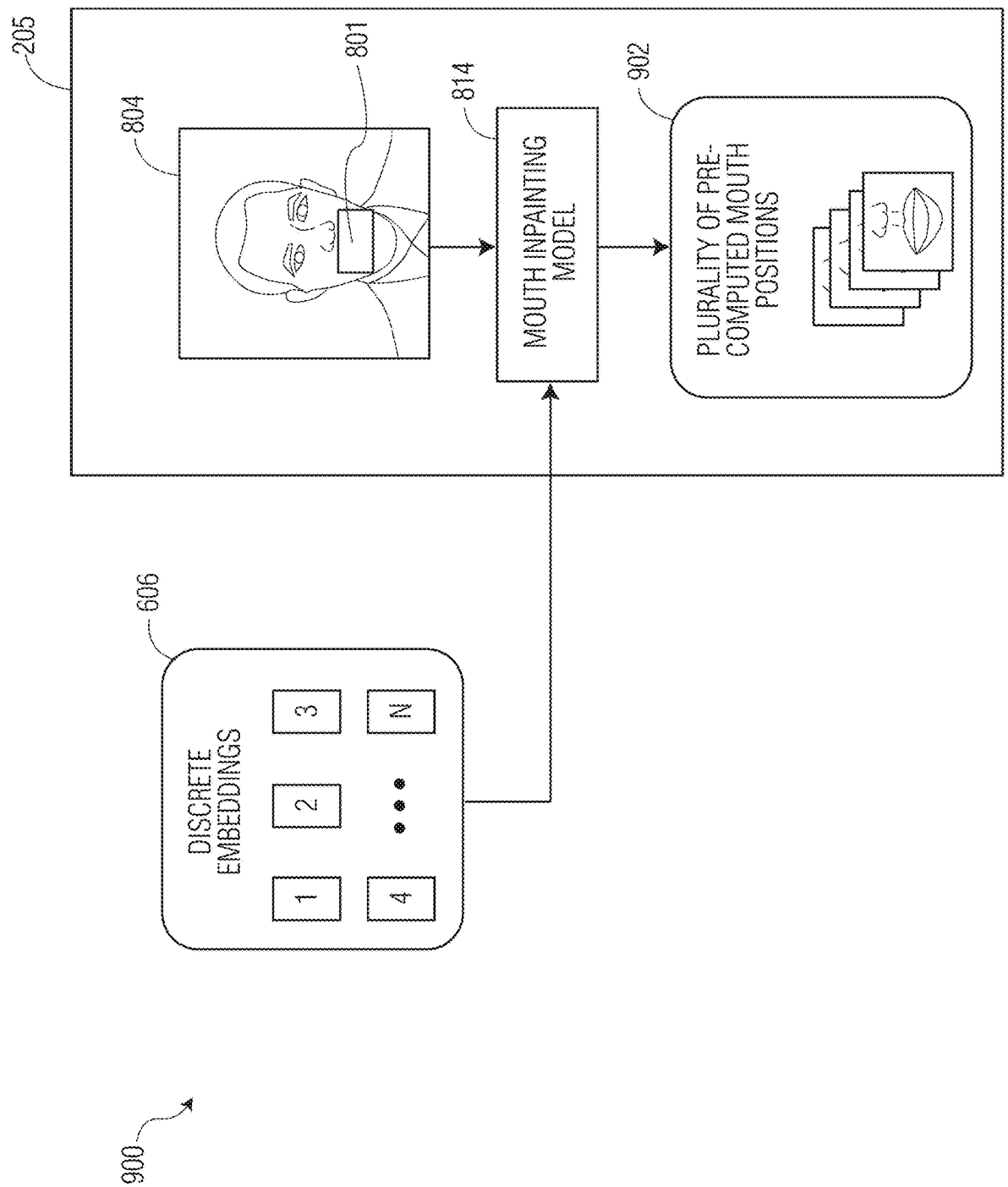
FIG. 9 is a diagram illustrating a method of forming a plurality of pre-computed mouth positions.

Referring now to FIG. 9, a diagram illustrating a method 900 of forming a plurality of pre-computed mouth positions 902 using the mouth inpainting model 814 is shown. As described above, the mouth inpainting model 814 is designed to fill a masked region 801 of a masked video frame 804 based on a discrete embedding 606. To generate the plurality of pre-computed mouth positions 902 for the masked video frame 804, the mouth inpainting model 814 may be run on a plurality of discrete embeddings 606 for the same masked video frame 804. In an example, the mouth inpainting model 814 may be run on every masked video frame 804 using every discrete embedding 606 stored in the one or more codebooks, representing all possible discrete audio representations. In this example, the plurality of pre-computed mouth positions 902 may represent every possible mouth position for each masked video frame 804.

Figure 10:
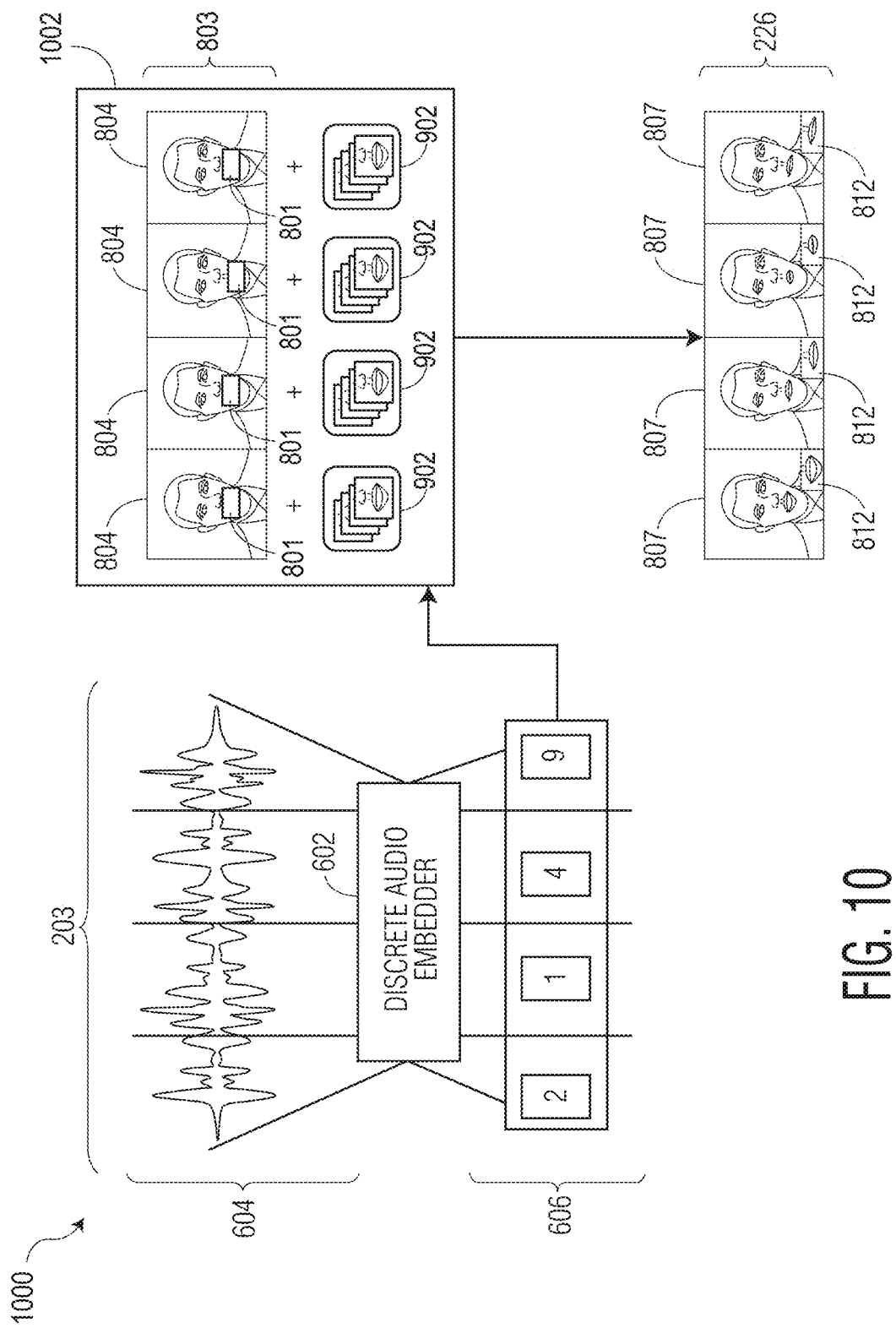
FIG. 10 is a production process for a talking face ("TF") model, according to an example of the present disclosure.

Referring now to FIG. 10, a production process 1000 for the TF model 112 (FIGS. 1-4) is shown. As described above, the discrete audio embedder 602 of the DAE model 203 may embed target audio 604 into a sequence of discrete embeddings 606. In an example, there may be one discrete embedding 606 per frame of video. Based on the TF instructions 120, the TF model 112 may select a pre-computed video template 1002 previously generated by the CIIP model 205. The pre-computed video template 1002 may include the plurality of masked video frames 804 of the masked video 803 and the plurality of pre-computed mouth positions 902 generated for each masked video frame 804. The pre-computed video template 1002 may be indexed and stored in the one or more codebooks within the one or more TF databases 126.

The TF model 112 may select a mouth position 812 of the plurality of pre-computed mouth positions 902 for each masked video frame 804 based on matching one or more indices within the one or more codebooks. For example, the mouth position 812 may be selected based on a determination that its index corresponds to an index of the discrete embedding 606 for that masked video frame 804. The mouth position 812 may be inpainted onto each masked video frame 804 to create the plurality of inpainted video frames 807 that form the video frame stream 226.

In addition to the pre-computed video templates 1002, the TF model 112 may generate pre-computed transition videos, which may be short videos (e.g., less than a second or 10-30 frames) that transition from the end of one pre-computed video template 1002 to one of the start of another pre-computed video template 1002 or the start of the same pre-computed video template 1002. The pre-computed transition video may be included in the video frame stream 226. In an example, the pre-computed transition videos may be included in the pre-computed video templates 1002 and generated in a similar manner.

The TF model 112 may organize the pre-computed video templates 1002 and pre-computed transition videos within the one or more TF databases 126 into a state graph, the structure of which may also be may be stored in the one or more TF databases 126. Each pre-computed video template 1002 may correspond to a particular facial state (e.g., happy-talking or sad-listening). This may allow a face to be rendered in real time according to a desired expression or emotion, for example, as indicated in the TF instructions 120. The pre-computed video templates 1002 may be configured as nodes in the state graph, which may allow for the TF model 112 to quickly switch between emotional states of the digital human dynamically and in real time without needing a heavy computational process to do so. To ensure seamless transitions, edges in the state graph may be the pre-computed transition videos that show how the face of the digital human moves from one state to another (e.g., from happy-talking to sad-listening) or from one state to the same state. As the TF model 112 traverses the state graph, it may dynamically stitch together different pre-computed video templates 1002 and pre-computed transition videos, enabling a versatile and efficient way to generate a broad range of talking-face animations from pre-computed footage.

To construct the state graph, range of states to be represented (e.g., various emotional expressions or conversational modes) may be selected. Each of these states may be assigned to a node, which may store a corresponding pre-computed video template 1002. Once the nodes are in place, edges may be created to link two different nodes (or the same node). Each edge may be associated with a pre-computed transition video that smoothly bridges the final frame of one pre-computed video template 1002 to the first frame of the same or another pre-computed video template 1002. Each node may have at least one outbound edge for transitioning to every other node in the state graph. The state graph may be a fully connected network of states allowing the TF model 112 to dynamically select paths to display any sequence of emotional or conversational changes. By adding nodes and their associated edges, the state graph can be expanded or refined by the system to cover more nuanced expressions or different scenarios as needed.

Each pair of nodes in the state graph may be coupled to at least one directed edge. In an example, a first directed edge may allow for traversal from Node A to Node B and a second directed edge may allow for traversal from Node B back to Node A. The transition from the last frame of a first pre-computed video template 1002 in Node A to the first frame of a second pre-computed video template 1002 in Node B may be distinct from the reverse direction. In addition, each node may also be coupled to a self-edge (from Node A to Node A) for scenarios in which the same state's pre-computed video template 1002 must be replayed consecutively, ensuring a smooth loop from the end of the node's pre-computed video template 1002 sequence back to the start.

Figure 11:
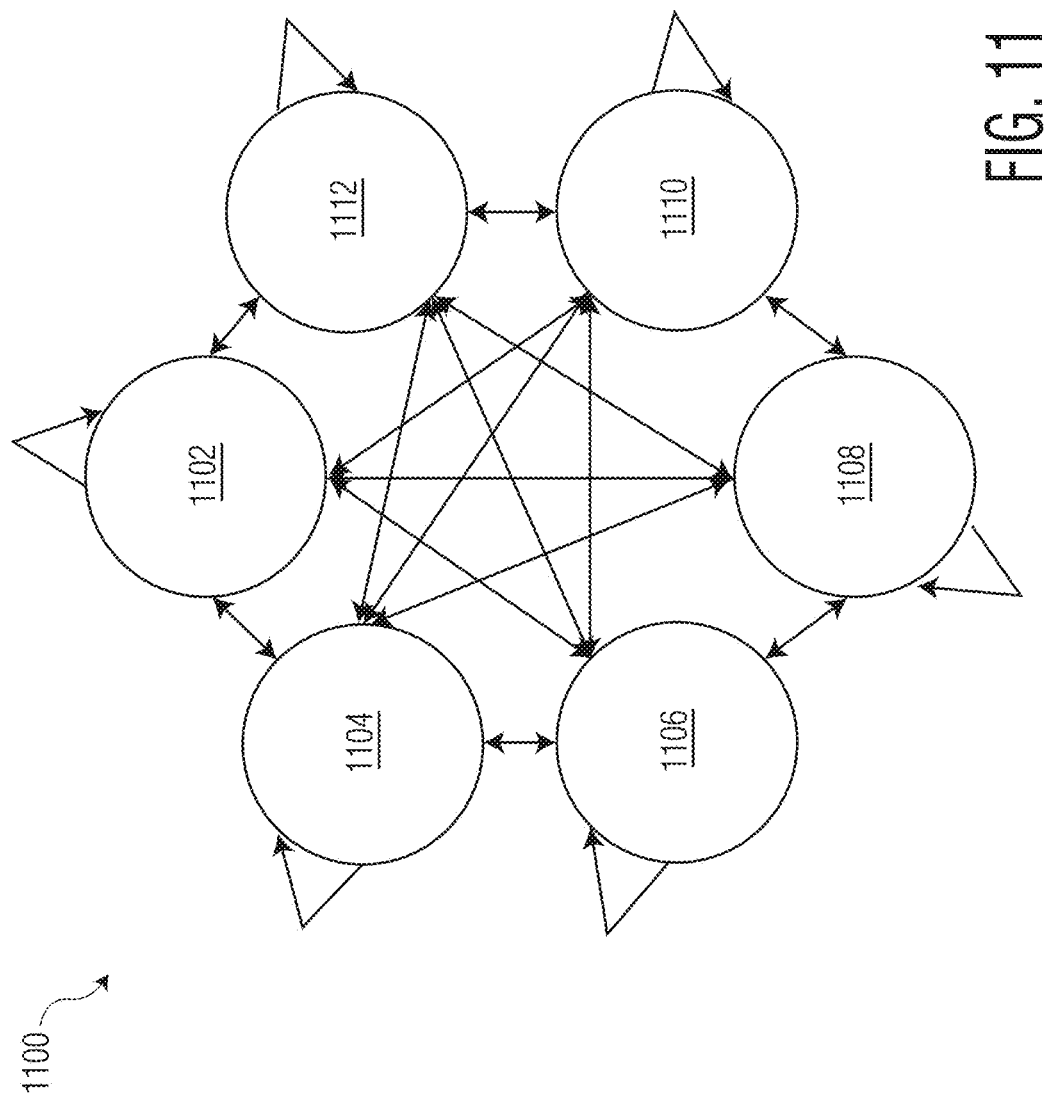
FIG. 11 is a diagram illustrating a state graph, according to an example of the present disclosure.

Referring now to FIG. 11, a diagram illustrating an example of a state graph 1100 is shown. The state graph 1100 may be made up of a plurality of nodes 1102-1112 that are connected to one another and themselves by a plurality of edges, shown as bidirectional arrows. Each node of the plurality of nodes 1102-1112 may represent a state (e.g., happy-talking, happy-listening, etc.) and may be associated with a pre-computed video template 1002 of the digital human in that state stored in the one or more TF databases 126. Each edge may represent a transition and may be associated with one or more pre-computed transition videos stored in the one or more TF databases 126. The edges between two different nodes of the plurality of nodes 1102-1112 may be bidirectional. In other words, there may be two transition videos associated with each of these edges and a specific transition video of the two transition videos may be used depending on the direction of traversal between each node of the plurality of nodes 1102-1112.

The state graph 1100 may be an approximation of the states a human face can portray. For example, the state graph 1100 may includes a first node 1102 representing a happy-talking ("HT") state, a second node 1104 representing a happy-listening ("HL") state, a third node 1106 representing a sad-listening ("SL") state, a fourth node 1108 representing a sad-talking ("ST") state, a fifth node 1110 representing a neutral-listening ("NL") state, and a sixth node 1112 representing a neutral-talking ("NT") state. A bidirectional edge may be constructed between different nodes of the plurality of nodes 1102-1112 and each node may have its own self-edge. Each edge may be associated with a transition video containing a smooth transition from the last frame in one node to the first frame in another node (or the same node).

It should be noted that the state graph 1100 is shown with six (6) nodes, six (6) self-edges, and fifteen (15) bidirectional edges. However, it is contemplated that the state graph 1100 may include any number of nodes, self-edges, and bidirectional edges arranged in any desired structure depending on how many states are to be traversed and how many transition videos are to be used. For example, the state graph 1100 may include hundreds of nodes with a corresponding number of edges. Further, the state graph 1100 shown is a fully connected state graph, in which every node is connected to every other node via an edge. It is contemplated that the state graph 1100 may not be fully connected (e.g., in a case where there is no transition from one state to another). For example, the state graph 1100 may include nodes that are associated with physical attributes (e.g., happy-wearing glasses, happy-no glasses, happy-removing glasses, etc.). In this case, the state graph 1100 may be traversed from a state of happy-wearing glasses to a state of happy-removing glasses to a state of happy-no glasses. However, the state graph 1100 would not be traversed from a state of from happy-wearing glasses to a state of happy-no glasses as this would be too big of a change to capture in the transition model. Having no edge between a node representing happy-wearing glasses and a node representing happy-no glasses in the state graph 1100 would prevent the TF model 112 from attempting this transition.

The TF model 112 may utilize a traversal algorithm to navigate the state graph 1100 based on the TF instructions 120, which may include what state the digital human should be in and the audio it should be saying. The traversal algorithm may begin by playing a pre-computed video template 1002 associated with the current node representing the digital human's current state (e.g., emotional state and/or conversational state). When the digital human reaction model 202 detects a change in the input from the user device 101 or a need to shift expressions (e.g., from the first node 1102 representing the HT state to the third node 1106 representing the SL state) it may select an edge that connects the first node 1102 node to the third node 1106. In an example, the edge may be the shortest edge that connects the first node 1102 node to the third node 1106. The transition video associated with that edge may be sent by the TF model 112 to the video segment generator 210 via the video frame stream 226. The TF model 112 may then inpaint the relevant mouth positions 812 matching the audio from the TF instructions 120 to the pre-computed video template 1002 associated with the third node 1106 and send the inpainted frames 807 to the video segment generator 210 via the video frame stream 226. By repeating this process, the digital human can seamlessly move through different states in response to context or user input.

In practice, a user may begin interacting with the digital human which may be in the first node 1102 representing the HT state. The digital human may greet the user and ask the user about their day through a video made from inpainted frames 807. The digital human may then transition to the second node 1104 representing the HL state, and the user may be shown the relevant transition video. The user may respond by indicating that they had a bad day and the digital human may transition from the second node 1104 representing the HL state to the third node 1106 representing the SL state, and the user may be shown the relevant transition video. After the user has finished replying, the digital human may transition from the third node 1106 representing the SL state to the fourth node 1108 representing the ST state, and the user may be shown the relevant transition video. The digital human may then reply with a context-aware (e.g., sympathetic) response through a video made from inpainted frames 807.

As described herein, algorithmic descriptions and representations are used to convey the substance of this disclosure effectively to others skilled in the art. These operations, while described functionally, computationally, or logically, are to be understood as being implemented by data structures, computer programs or equivalent electrical circuits, field programmable gate arrays (FPGAs), microcode, or the like. Furthermore, at times, it may be convenient to refer to these arrangements of operations as routines or algorithms. The described operations and their routines/algorithms may be embodied in specialized software, firmware, specially configured hardware or any combinations thereof.

The methods described herein may be performed by processing logic that may comprise hardware (e.g., circuitry, dedicated logic, programmable logic, microcode, etc.), software (such as instructions run on a processing device), or a combination thereof. In one embodiment, the methods described herein may be performed by one or more specialized processing components.

Systems and methods of the present disclosure may include and/or may be implemented by the first configuration 100 of the digital human interface 130 and/or the second configuration 300 of the digital human interface 130', which may include one or more specialized computers including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to as servers, personal computers (PCs), mobile devices, and other terms for computing/communication devices. For purposes of this disclosure, those terms used herein are interchangeable, and any special purpose computer particularly configured for performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with an electronic information system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with the systems and methods described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the first configuration 100 of the digital human interface 130 and/or the second configuration 300 of the digital human interface 130' and that the first configuration 100 of the digital human interface 130 and/or the second configuration 300 of the digital human interface 130' to perform any one or more of the methodologies of the present disclosure.

Referring now to FIG. 12, a functional block diagram of the first configuration 100 of the digital human interface 130 and/or the second configuration 300 of the digital human interface 130') in the example form of computer system 1200 within which a set of instructions for causing the first configuration 100 of the digital human interface 130 and/or the second configuration 300 of the digital human interface 130' to perform any one or more of the methodologies, processes or functions discussed herein may be executed. In some examples, the first configuration 100 of the digital human interface 130 and/or the second configuration 300 of the digital human interface 130' may be connected (e.g., networked) to other machines as described above. The first configuration 100 of the digital human interface 130 and/or the second configuration 300 of the digital human interface 130' may operate in the capacity of a server or a client machine in a client-server network environment, or as a peer machine in a peer-to-peer (or distributed) network environment. The first configuration 100 of the digital human interface 130 and/or the second configuration 300 of the digital human interface 130' may be any special-purpose machine capable of executing a set of instructions (sequential or otherwise) that specify actions to be taken by that machine for performing the functions described herein. Further, while only the first configuration 100 of the digital human interface 130 and/or the second configuration 300 of the digital human interface 130' are illustrated, the term "digital human interface" shall also be taken to include any collection of machines that individually or jointly execute a set (or multiple sets) of instructions to perform any one or more of the methodologies discussed herein. In some examples, the first configuration 100 of the digital human interface 130 and/or the second configuration 300 of the digital human interface 130' may be implemented by the example machine shown in FIG. 12 (or a combination of two or more of such machines).

The example computer system 1200 may include processing device 1202, memory 1206, data storage device 1210 and communication interface 1212, which may communicate with each other via data and control bus 1218. In some examples, computer system 1200 may also include display device 1214 and/or user interface 1216.

Display device 1214 may be any known display technology, including but not limited to display devices using Liquid Crystal Display (LCD) or Light Emitting Diode (LED) technology.

The processing device 1202 may use any known processor technology, including but not limited to graphics processors and multi-core processors. The processing device 1202 may include, without being limited to, a microprocessor, a central processing unit, an application-specific integrated circuit (ASIC), a field programmable gate array (FPGA), a digital signal processor (DSP) and/or a network processor. The processing device 1202 may be configured to execute processing logic 1204 for performing the operations described herein. The processing device 1202 may include a special-purpose processing device specially programmed with processing logic 1204 to perform the operations described herein. The processing device 1202 may be operatively coupled to the memory 1206.

The memory 1206 may include, for example, without being limited to, at least one of a read-only memory (ROM), a random-access memory (RAM), a flash memory, a dynamic RAM (DRAM) and a static RAM (SRAM), storing computer-readable instructions 1208 executable by processing device 1202. The memory 1206 may include a non-transitory computer readable storage medium storing computer-readable instructions 1208 executable by processing device 1202 for performing the operations described herein. Although one memory 1206 is illustrated in FIG. 12, in some examples, computer system 1200 may include two or more memory devices (e.g., dynamic memory and static memory).

The user interface 1216 may be any known input device technology, including but not limited to a keyboard (including a virtual keyboard), mouse, track ball, camera, and touch-sensitive pad or display.

The data and control bus 1218 may be any known internal or external bus technology, including but not limited to industry standard architecture (ISA), extended ISA (EISA), peripheral component interconnect (PCI), PCI Express, universal serial bus (USB), Serial advanced technology attachment (ATA) or Fire Wire.

The computer system 1200 may include communication interface 1212, for direct communication with other computers (including wired and/or wireless communication) and/or for communication with a network. In some examples, computer system 1200 may include display device 1214 (e.g., a liquid crystal display (LCD), a touch sensitive display, etc.).

In some examples, the computer system 1200 may include data storage device 1210 storing instructions (e.g., software) for performing any one or more of the functions described herein. Data storage device 1210 may include a non-transitory computer-readable storage medium, including, without being limited to, solid-state memories, optical media and magnetic media.

One or more features or steps of the disclosed embodiments may be implemented using an application programming interface (API). An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer may employ to access functions supporting the API.

In some implementations, an API call may report to an application the capabilities of a device running the application, such as input capability, output capability, processing capability, power capability, communications capability, etc.

The methods described herein, including those with reference to one or more flowcharts, may be performed by a controller and/or processing device (e.g., smartphone, computer, etc.). The methods may include one or more operations, functions, or actions as illustrated in one or more of blocks. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation. Dashed lines may represent optional and/or alternative steps.

Additional examples of the presently described method and device embodiments are suggested according to the structures and techniques described herein. Other non-limiting examples may be configured to operate separately or may be combined in any permutation or combination with any one or more of the other examples provided above or throughout the present disclosure. Components and/or arrangement of components illustrated in one figure may be incorporated into any other figure.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

In general, terminology may be understood at least in part from usage in context. For example, terms, such as "and", "or", or "and/or" as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The terms "including" and "comprising" should be interpreted as meaning "including but not limited to." If not already set forth explicitly in the claims, the term "a" should be interpreted as "at least one" and the terms "the, said, etc." should be interpreted as "the at least one, said at least one, etc."

The present disclosure is described with reference to block diagrams and operational illustrations of methods and devices. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks may occur out of the order noted in the operational illustrations. For example, two blocks shown in succession may be executed substantially concurrently or the blocks may sometimes be executed in the reverse order, depending upon the functionality/acts involved.

It is the Applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A method of rendering context-aware and interactive artificial intelligence generated videos in real time, the method comprising:
   receiving, by an interaction model, input from an input/output ("I/O") device of a user device, the input comprising one or more of audio, video, and text;
   determining, by the interaction model, an inferred state of the user based on the input;
   generating, by the interaction model, a talking face ("TF") instruction based on the inferred state of the user, the TF instruction comprising an audio segment stream generated by one or more of a text-to-speech ("TTS") model and a large language model ("LLM") model;
   traversing, by a TF model, from a first node of a state graph to a second node of the state graph via an edge based on the TF instruction, the state graph stored in one or more TF databases;
   retrieving, by the TF model, a transition video associated with the edge from a plurality of transition videos stored the one or more TF databases;
   retrieving, by the TF model, a pre-computed video template associated with the second node from a plurality of pre-computed video templates stored the one or more TF databases, the pre-computed video template comprising a plurality of masked video frames and a plurality of pre-computed mouth positions for each masked video frame of the plurality of masked video frames;
   inpainting, by the TF model, a pre-computed mouth position of the plurality of pre-computed mouth positions into a masked region of each masked video frame of the plurality of masked video frames based on the audio segment stream to form a video frame stream comprising a plurality of inpainted frames;
   generating, by the interaction model, a video from the transition video and the video frame stream; and
   presenting, by the interaction model, the video on an interactive graphical user interface ("GUI") of the user device.

2. The method of claim 1, wherein the generating the TF instruction based on the inferred state of the user comprises:
   generating, by the interaction model, an LLM prompt for the LLM model based on the input and the inferred state of the user;
   transmitting, by the interaction model, the prompt to an LLM operator comprising the LLM model;
   receiving, by the interaction model, the text segment stream from the LLM operator based on the prompt;
   transmitting, by the interaction model, the text segment stream to the TTS model; and
   receiving, by the interaction model, the audio segment stream from the TTS model.

3. The method of claim 2, wherein the LLM prompt comprises one or more of a history of interactions with the user, one or more elements of a user text stream generated from the input, and an instruction for an LLM model.

4. The method of claim 2, wherein the LLM operator comprises:
   the LLM model configured to generate a text stream based on the LLM prompt; and
   a text batcher configured to utilize an algorithm to process the text stream and iteratively output predefined segments of text for the text stream.

5. The method of claim 1, wherein the state graph comprises a plurality of nodes each representing a state of a digital human and a plurality of edges each representing one or more of a transition from a first state of the digital human to a second state of the digital human and a transition from the first state of the digital human back to the first state of the digital human.

6. The method of claim 5, wherein each node of the plurality of nodes is associated with a respective one of the plurality of pre-computed video templates and each edge of the plurality of edges is associated with a respective one of the plurality of transition videos.

7. The method of claim 1, wherein the TF model comprises a discrete audio embedding ("DAE") model configured to generate one or more discrete embeddings for each segment of the audio segment stream that are matched to the plurality of pre-computed mouth positions based on one or more indices.

8. The method of claim 7, wherein each segment of the audio stream corresponds to each masked video frame of the plurality of masked video frames.

9. The method of claim 7, wherein the plurality of pre-computed mouth positions for each masked video frame are generated by:

receiving, by the DAE model, a plurality of audio clips;
segmenting, by the DAE model, each audio clip of the plurality of audio clips into a plurality of segments;
generating, by the DAE model, one or more discrete embeddings for each segment of the plurality of segments of each audio clip to form a plurality of discrete embeddings; and
generating, by a conditional image inpainting ("CIIP") model, a mouth position for each of the plurality of discrete embeddings for each masked video frame.

10. The method of claim 9, wherein the plurality of discrete embeddings are stored in a codebook in the one or more TF databases.

11. The method of claim 9, wherein the plurality of discrete embeddings comprise every discrete audio representation of human speech.

12. The method of claim 9, wherein the CIIP model is trained by:
receiving, by the CIIP model, one or more discrete embeddings from the DAE model, the one or more discrete embeddings generated from audio of a training video;
generating, by the CIIP model, one or more mouth positions based on the one or more discrete embeddings;
inpainting, by the CIIP model, the one or more mouth positions into one or more masked regions of masked video frames of a masked video to form an inpainted video, the masked video corresponding to the training video; and
comparing, by the CIIP model, the inpainted video to the training video to generate one or more training metrics.

13. The method of claim 7, wherein the DAE model is trained by:
receiving, by the DAE model, an audio clip;
segmenting, by the DAE model, the audio clip into a plurality of segments;
generating, by the DAE model, one or more discrete embeddings for each segment of the plurality of segments;
reconstructing, by the DAE model, the one or more discrete embeddings into a reconstructed audio clip; and
comparing, by the DAE model, the reconstructed audio clip to the audio clip to generate one or more training metrics.

14. The method of claim 1, wherein the generating the TF instruction based on the inferred state of the user comprises:
transmitting, by the interaction model, the audio to an LLM operator comprising the LLM model and the TTS model, the LLM operator configured to:
convert, by speech recognition system, the audio into a user text stream,
generate, by an LLM prompt generator, an LLM prompt based on the text stream and the inferred state of the user,
generate, by the LLM model, a text stream based on the LLM prompt,
generate, by a text batcher, a text segment stream from the text stream,
generate, by the TTS model, the audio segment stream; and
receiving, by the interaction model, the audio segment stream.

15. The method of claim 1, wherein the generating the TF instruction based on the inferred state of the user comprises:
transmitting, by the interaction model, the audio to an LLM operator comprising the LLM model; and
receiving, by the interaction model, the audio segment stream.

16. A system for rendering context-aware and interactive artificial intelligence generated videos in real time, system method comprising:
one or more processors operatively coupled to a memory configured to store computer-readable instructions that, when executed by the one or more processors, cause the one or more processors to:
receive, by an interaction model, input from an input/output ("I/O") device of a user device, the input comprising one or more of audio, video, and text;
determine, by the interaction model, an inferred state of the user based on the input;
generate, by the interaction model, a talking face ("TF") instruction based on the inferred state of the user, the TF instruction comprising an audio segment stream generated by one or more of a text-to-speech ("TTS") model and a large language model ("LLM") model;
traverse, by a TF model, from a first node of a state graph to a second node of the state graph via an edge based on the TF instruction, the state graph stored in one or more TF databases;
retrieve, by the TF model, a transition video associated with the edge from a plurality of transition videos stored the one or more TF databases;
retrieve, by the TF model, a pre-computed video template associated with the second node from a plurality of pre-computed video templates stored the one or more TF databases, the pre-computed video template comprising a plurality of masked video frames and a plurality of pre-computed mouth positions for each masked video frame of the plurality of masked video frames;
inpaint, by the TF model, a pre-computed mouth position of the plurality of pre-computed mouth positions into a masked region of each masked video frame of the plurality of masked video frames based on the audio segment stream to form a video frame stream comprising a plurality of inpainted frames;
generate, by the interaction model, a video from the transition video and the video frame stream; and
display, by the interaction model, the video on an interactive graphical user interface ("GUI") of the user device.

17. The system of claim 16, wherein the generate the TF instruction based on the inferred state of the user comprises:
generating, by the interaction model, an LLM prompt for the LLM model based on the input and the inferred state of the user;
transmitting, by the interaction model, the prompt to an LLM operator comprising the LLM model;
receiving, by the interaction model, a text segment stream from the LLM operator based on the prompt;
transmitting, by the interaction model, the text segment stream to the TTS model; and
receiving, by the interaction model, the audio segment stream from the TTS model.

18. The system of claim 17, wherein the LLM prompt comprises one or more of a history of interactions with the user, one or more elements of a user text stream generated from the input, and an instruction for an LLM model.

19. The system of claim 17, wherein the LLM operator comprises:
the LLM model configured to generate a text stream based on the LLM prompt; and a text batcher configured to utilize an algorithm to process the text stream and iteratively output short segments of text for the text stream.

20. The system of claim 16, wherein the state graph comprises a plurality of nodes each representing a state of a digital human and a plurality of edges each representing one or more of a transition from a first state of the digital human to a second state of the digital human and a transition from the first state of the digital human back to the first state of the digital human.

21. The system of claim 20, wherein each node of the plurality of nodes is associated with a pre-computed video template of the plurality of pre-computed video templates and each edge pf the plurality of edges is associated with a transition video of the plurality of transition videos.

22. The system of claim 16, wherein the TF model comprises a discrete audio embedding ("DAE") model configured to generate one or more discrete embeddings for each segment of the audio segment stream that are matched to the plurality of pre-computed mouth positions based on one or more indices.

23. The system of claim 22, wherein each segment of the audio stream corresponds to each masked video frame of the plurality of masked video frames.

24. The system of claim 22, wherein the plurality of pre-computed mouth positions for each masked video frame are generated by:
receiving, by the DAE model, a plurality of audio clips;
segmenting, by the DAE model, each audio clip of the plurality of audio clips into a plurality of segments;
generating, by the DAE model, one or more discrete embeddings for each segment of the plurality of segments of each audio clip to form a plurality of discrete embeddings; and
generating, by a conditional image inpainting ("CIIP") model, a mouth position for each of the plurality of discrete embeddings for each masked video frame.

25. The system of claim 24, wherein the plurality of discrete embeddings are stored in a codebook in the one or more TF databases.

26. The system of claim 24, wherein the plurality of discrete embeddings comprise every discrete audio representation of human speech.

27. The system of claim 24, wherein the CIIP model is trained by:
receiving, by the CIIP model, one or more discrete embeddings from the DAE model, the one or more discrete embeddings generated from audio of a training video;
generating, by the CIIP model, one or more mouth positions based on the one or more discrete embeddings;
inpainting, by the CIIP model, the one or more mouth positions into one or more masked regions of masked video frames of a masked video to form an inpainted video, the masked video corresponding to the training video; and
comparing, by the CIIP model, the inpainted video to the training video.

28. The system of claim 22, wherein the DAE model is trained by:
receiving, by the DAE model, an audio clip;
segmenting, by the DAE model, the audio clip into a plurality of segments;
generating, by the DAE model, one or more discrete embeddings for each segment of the plurality of segments;
reconstructing, by the DAE model, the one or more discrete embeddings into a reconstructed audio clip; and
comparing, by the DAE model, the reconstructed audio clip to the audio clip.

29. The system of claim 16, wherein the generate the TF instruction based on the inferred state of the user comprises:
transmitting, by the interaction model, the audio to an LLM operator comprising the LLM model and the TTS model, the LLM operator configured to:
convert, by speech recognition system, the audio into a user text stream,
generate, by an LLM prompt generator, an LLM prompt based on the text stream and the inferred state of the user,
generate, by the LLM model, a text stream based on the LLM prompt,
generate, by a text batcher, a text segment stream from the text stream,
generate, by the TTS model, the audio segment stream; and
receiving, by the interaction model, the audio segment stream from the LLM operator.

30. The system of claim 16, wherein the generate the TF instruction based on the inferred state of the user comprises:
transmitting, by the interaction model, the audio to an LLM operator comprising the LLM model; and
receiving, by the interaction model, the audio segment stream from the LLM operator.

* * * * *